(12) United States Patent
Leyden et al.

(10) Patent No.: US 12,105,933 B2
(45) Date of Patent: Oct. 1, 2024

(54) GRAPHICAL USER INTERFACE TO TRACK DYNAMIC DATA

(71) Applicant: IHS MARKIT, New York, NY (US)

(72) Inventors: Anthony Leyden, New York, NY (US); William MacPherson, New York, NY (US)

(73) Assignee: IHS MARKIT, New York, NY (US)

( * ) Notice: Subject to any disclaimer, the term of this patent is extended or adjusted under 35 U.S.C. 154(b) by 0 days.

(21) Appl. No.: 18/102,653

(22) Filed: Jan. 27, 2023

(65) Prior Publication Data

US 2023/0176713 A1    Jun. 8, 2023

Related U.S. Application Data

(63) Continuation of application No. 17/319,715, filed on May 13, 2021, now Pat. No. 11,625,149, which is a (Continued)

(51) Int. Cl.
*G06T 11/20* (2006.01)
*G06F 3/0482* (2013.01)
(Continued)

(52) U.S. Cl.
CPC .......... *G06F 3/0482* (2013.01); *G06F 3/0483* (2013.01); *G06Q 40/04* (2013.01); *G06T 11/206* (2013.01)

(58) Field of Classification Search
CPC ..... G06F 3/0482; G06F 3/0483; G06Q 40/04; G06T 11/206
See application file for complete search history.

(56) References Cited

U.S. PATENT DOCUMENTS 5,915,209 A    6/1999  Lawrence
6,014,643 A    1/2000  Minton
(Continued)

OTHER PUBLICATIONS

"Why the US Treasury Began Auctioning Treasury Bills in 1929" by Kenneth D.Garbade, FRBNY Economic Policy Review / Jul. 2008 . pp. 1-17 (Year: 2008).*

(Continued)

*Primary Examiner* — Hien L Duong
(74) *Attorney, Agent, or Firm* — FOLEY & LARDNER LLP

(57) ABSTRACT

Disclosed are methods and systems of displaying graphical user interfaces (GUIs) that illustrate various offering analytics and insights. The GUI display selectable graphical components representing attributes of maturity bonds, wherein when a user interacts with a first graphical component corresponding to a first maturity bond, the server dynamically updates a second section of the GUI. The second section of the GUI displays time periods corresponding to a maturity date for the first maturity bond, wherein the server displays a vertical bar for each time period, a height of the vertical bar indicating a value of the maturity bond, wherein each vertical bar is divided into two areas a first area corresponding to a competitive sale of the first maturity bond, and a second area corresponding to a negotiated sale of the first maturity bond.

20 Claims, 23 Drawing Sheets

Related U.S. Application Data continuation of application No. 16/783,014, filed on Feb. 5, 2020, now Pat. No. 11,048,386, which is a continuation-in-part of application No. 16/407,069, filed on May 8, 2019, now Pat. No. 11,042,263, which is a continuation of application No. 15/815,329, filed on Nov. 16, 2017, now Pat. No. 10,331,302.

(60) Provisional application No. 62/424,239, filed on Nov. 18, 2016.

(51) Int. Cl.
*G06F 3/0483* (2013.01)
*G06Q 40/04* (2012.01)

(56) References Cited

U.S. PATENT DOCUMENTS

| | | | |
|---|---|---|---|
| 6,408,282 B1 | 6/2002 | Buist | |
| 6,876,309 B1 | 4/2005 | Lawrence | |
| 7,415,436 B1 | 8/2008 | Evelyn et al. | |
| 7,707,091 B1 * | 4/2010 | Kauffman | G06Q 30/02 |
| | | | 705/36 R |
| 7,720,742 B1 | 5/2010 | Mauro et al. | |
| 7,827,080 B2 | 11/2010 | Long | |
| 7,966,244 B1 | 6/2011 | Buck | |
| 8,175,955 B2 | 5/2012 | Friesen et al. | |
| 8,244,621 B1 | 8/2012 | Swearingen et al. | |
| 8,346,647 B1 | 1/2013 | Phelps et al. | |
| 8,510,206 B2 | 8/2013 | Faier | |
| 8,688,564 B2 | 4/2014 | Friesen et al. | |
| 8,768,800 B2 | 7/2014 | Milosavljevic et al. | |
| 2002/0016758 A1 | 2/2002 | Grigsby | |
| 2002/0087451 A1 | 7/2002 | Rieger et al. | |
| 2002/0091621 A1 | 7/2002 | Conklin et al. | |
| 2002/0099645 A1 | 7/2002 | Agarwal et al. | |
| 2002/0156719 A1 | 10/2002 | Finebaum et al. | |
| 2003/0004862 A1 | 1/2003 | Lutnick et al. | |
| 2005/0273408 A1 | 12/2005 | Bandman | |
| 2006/0070013 A1 | 3/2006 | Vignet | |
| 2007/0083457 A1 | 4/2007 | Evelyn et al. | |
| 2008/0215496 A1 | 9/2008 | Hockley et al. | |
| 2009/0096812 A1 | 4/2009 | Boixel et al. | |
| 2009/0112775 A1 | 4/2009 | Chiulli et al. | |
| 2010/0049686 A1 | 2/2010 | Gotz et al. | |
| 2011/0040665 A1 | 2/2011 | Long | |
| 2011/0246391 A1 | 10/2011 | Henderson | |
| 2011/0246873 A1 | 10/2011 | Tolle et al. | |
| 2012/0218254 A1 * | 8/2012 | Abeln | G06T 19/00 |
| | | | 345/419 |
| 2012/0313957 A1 | 12/2012 | Fisher et al. | |
| 2013/0055146 A1 | 2/2013 | Armitage | |
| 2013/0073479 A1 | 3/2013 | Koblas et al. | |
| 2013/0204768 A1 * | 8/2013 | Avery | G06Q 30/08 |
| | | | 705/37 |
| 2013/0339209 A1 | 12/2013 | German | |
| 2014/0108293 A1 | 4/2014 | Barrett et al. | |
| 2014/0114882 A1 | 4/2014 | Thoma | |
| 2014/0279686 A1 * | 9/2014 | Avery | G06Q 40/06 |
| | | | 705/36 R |
| 2014/0289090 A1 * | 9/2014 | Avery | G06Q 40/04 |
| | | | 705/37 |
| 2015/0095265 A1 | 4/2015 | Feinendegen et al. | |
| 2015/0206245 A1 | 7/2015 | Basu et al. | |
| 2015/0348192 A1 | 12/2015 | Broder | |
| 2015/0356160 A1 | 12/2015 | Berwick et al. | |
| 2016/0155200 A1 | 6/2016 | Basu et al. | |
| 2016/0210696 A1 | 7/2016 | Quinton | |
| 2016/0350853 A1 | 12/2016 | Gentile | |
| 2017/0098318 A1 | 4/2017 | Iannaccone et al. | |
| 2018/0129365 A1 | 5/2018 | Dayan et al. | |
| 2018/0158142 A1 | 6/2018 | Gunther | |
| 2018/0165336 A1 | 6/2018 | Venkateswarulu et al. | |
| 2018/0189873 A1 | 7/2018 | Annett et al. | |
| 2020/0167869 A1 | 5/2020 | Magdelinic | |
| 2020/0193522 A1 | 6/2020 | Brown | |

OTHER PUBLICATIONS

The Term Securities lending Facility: Origin, Design, and Effects by Fleming et al, Federal Reserve Bank of New York current issue in economics and Finance /vol. 15, No. 2, Feb. 2009. pp. 11. (Year: 2009).*

A No-Arbitrage Analysis of Macroeconomic Determinants of the Credit Spread Term Structure by Wu et al. Management Science , Published 2008, pp. 1-33 (Year: 2008).

* cited by examiner

FIG. 1
PRIOR ART

| ☐ IPREO MUNI | | | | | | | | |
|---|---|---|---|---|---|---|---|---|
| < $450,000 | BOND SERIES 1 | | | | DEAL MONITOR | | STOCK ⊙ | SERIES 1,2 > |
| MEMORY | ANNOUCE | COUPON | INSTITUTIONAL | STOCK | RETAIL | TOTAL | | BALANCE |
| 1:07/01/17 | 10 | 5,000 | 15 | 0 | 10 | 25 | | 0 |
| 1:07/01/18 | 10 | 5,000 | 15 | 0 | 10 | 25 | | 0 |
| 1:07/01/19 | 10 | 5,000 | 15 | 0 | 10 | 25 | | 0 |
| 1:07/01/20 | 10 | | TOP MANAGERS TOP ACCOUNTS | | | | REPORTS > | 0 |
| 1:07/01/21 | 10 | | | | | | | 0 |
| 1:07/01/22 | 10 | | ASSET MANAGER A | | | | 53,000 | 0 |
| 1:07/01/23 | 10 | | ASSET MANAGER B | | | | 37,500 | 0 |
| 1:07/01/24 | 10 | | XYZ CAPITAL | | | | 23,000 | 0 |
| 1:07/01/25 | 10 | | ASSET MANAGER C | | | | 22,500 | 0 |
| 1:07/01/26 | 10 | | AB CAPITAL | | | | 17,500 | 0 |
| 1:07/01/27 | 10 | | ASSET MANAGER D | | | | 13,280 | 0 |
| 1:07/01/28 | 10 | | XYZ TRUST | | | | 7,870 | 0 |
| 1:07/01/29 | 10 | | | | | | | 0 |
| 1:07/01/30 | 10 | | | | | | | 0 |
| 1:07/01/31 | 10 | | | | | | | 0 |
| 1:07/01/32 | 10 | | | | | | | 0 |
| 1:07/01/33 | 10 | | | | | | | 0 |
| 1:07/01/34 | 10 | | | | | | | 0 |
| 1:07/01/35 | 10 | | | | | | | 0 |
| 1:07/01/36 | 10 | | | | | | | 0 |
| 1:07/01/37 | 10 | | | | | | | 0 |
| 1:07/01/38 | 10 | | | | | | | 10 |
| 1:07/01/39 | 10 | | | | | | | 10 |
| 1:07/01/40 | 10 | | | | | | | 10 |
| 2:07/01/17 | 10 | | | | | | | 10 |
| 2:07/01/18 | 10 | | | | | | | |
| 2:07/01/19 | 10 | | | | | | | |
| 2:07/01/20 | 10 | | | | | | | |
| TOTAL | 450 | 5,000 | 15 / 355 | 0 | 10 / 205 | 25 / 560 | | 210 |

| OVERVIEW | RETAIL | PRIORITY | | | | | | | | | |
|---|---|---|---|---|---|---|---|---|---|---|---|
| MATURITY | SERIES | COUPON | AMOUNT | NJ RETAIL | NA RETAIL | TOTAL RETAIL | INSTITUTIONAL | STOCK | TOTAL | BALANCE | SUBSCRIPTION |
| TOTAL: (AMOUNT IN 18M) | | | 219,345 | 44,590 | 14,655 | 59,245 | 224,050 | 26,000 | 300,295 | 34,805 | 1.4x |
| 05/15/2017 | 1 | 5.000% | 5,000 | 0 | 0 | 0 | 0 | 0 | 0 | 5,000 | 0% |
| 07/01/2017 | 2 | 5.000% | 10,000 | 0 | 0 | 0 | 2,900 | 0 | 2,900 | 7,100 | 29% |
| 05/15/2018 | 1 | 5.000% | 2,260 | 50 | 1,100 | 1,150 | 2,000 | 0 | 3,150 | -890 | 1.4x |
| 07/01/2018 | 2 | 5.000% | 10,000 | 0 | 0 | 0 | 3,000 | 0 | 3,000 | 7,000 | 30% |
| 05/15/2019 | 1 | 5.000% | 4,575 | 60 | 3,500 | 3,560 | 2,500 | 4,000 | 10,060 | -5,485 | 2.2x |
| 05/15/2020 | 1 | 5.000% | 3,740 | 0 | 2,650 | 2,650 | 2,000 | 0 | 4,650 | -910 | 1.2x |
| 05/15/2021 | 1 | 5.000% | 3,920 | 2,300 | 3,000 | 5,300 | 0 | 0 | 5,300 | -1,380 | 1.4x |
| 05/15/2022 | 1 | 4.000% | 15,000 | 0 | 0 | 0 | 20,500 | 0 | 20,500 | -5,500 | 1.4x |
| 05/15/2023 | 1 | 5.000% | 4,090 | 570 | 5 | 575 | 5,500 | 0 | 6,075 | -1,985 | 1.5x |
| 05/15/2024 | 1 | 5.000% | 4,280 | 505 | 1,650 | 2,155 | 4,780 | 0 | 6,935 | -2,655 | 1.6x |
| 05/15/2025 | 1 | 5.000% | 6,260 | 770 | 0 | 770 | 5,000 | 0 | 5,770 | 490 | 92% |
| 05/15/2026 | 1 | 5.000% | 6,510 | 675 | 150 | 825 | 5,000 | 0 | 5,825 | 685 | 89% |
| 05/15/2027 | 1 | 5.000% | 6,800 | 60 | 100 | 160 | 5,000 | 0 | 5,160 | 1,640 | 76% |
| 05/15/2028 | 1 | 5.000% | 7,110 | 2,000 | 0 | 2,000 | 14,000 | 0 | 16,000 | -8,890 | 2.3x |
| 05/15/2029 | 1 | 2.250% | 7,395 | 6,500 | 0 | 6,500 | 6,000 | 7,000 | 19,500 | -12,105 | 2.6x |
| 05/15/2030 | 1 | 2.500% | 7,480 | 3,750 | 0 | 3,750 | 3,000 | 0 | 6,750 | 730 | 90% |
| 05/15/2031 | 1 | 4.000% | 7,630 | 4,600 | 0 | 4,600 | 6,000 | 0 | 10,600 | -2,970 | 1.4x |
| 05/15/2032 | 1 | 4.000% | 7,870 | 2,750 | 0 | 2,750 | 14,370 | 0 | 17,120 | -9,250 | 2.2x |
| 05/15/2033 | 1 | 4.000% | 17,660 | 4,000 | 0 | 4,000 | 10,000 | 0 | 14,000 | 3,660 | 79% |
| 05/15/2033 | 1 | 4.000% | 18,315 | 4,000 | 0 | 4,000 | 19,500 | 5,000 | 28,500 | -10,185 | 1.6x |
| 07/01/2033 | 2 | 5.000% | 10,000 | 0 | 1,500 | 1,500 | 0 | 0 | 1,500 | 8,500 | 15% |
| 05/15/2034 | 1 | 3.000% | 16,420 | 1,000 | 1,000 | 2,000 | 35,000 | 0 | 37,000 | -20,580 | 2.3x |
| 05/15/2035 | 1 | 3.000% | 16,920 | 1,000 | 0 | 1,000 | 26,000 | 10,000 | 37,000 | -20,080 | 2.2x |
| 05/15/2037 | 1 | 3.000% | 20,110 | 10,000 | 0 | 10,000 | 32,000 | 0 | 42,000 | -21,890 | 2.1x |

MUNICIPALS | DEAL MONITOR | STREET CALENDAR — TYLER TRADER

< WEEK OF MAY 15, 2018 »  SAVED FILTER SETS: SELECT ▼  SAVE FILTERS

TOTAL CALENDAR SIZE $7.1Bn
NEGOTIATED: $4.0Bn
COMPETITIVE: $3.1Bn
TAX-EXEMPT: $6.5Bn
TAXABLE: $0.6Bn

▼ ADVANCED

WEEK'S SUPPLY (7,112,500)

2018 2020 2022 2024 2026 2028 2030 2032 2034 2036 2038 2040 2042 2044 2046 2048

SHOWING 768 OF 768 RECORDS | 0 FILTERS APPLIED ▼ | CLEAR ALL FILTERS

| DATE | PAR | ISSUER DESCRIPTION | STATE | RATINGS (M/S/F/K) | TAX STATUS | TYPE | SECTOR | CERTS | STRUCTURE | LEAD MANAGER |
|---|---|---|---|---|---|---|---|---|---|---|
| THU 5/3 | 750,000 | NEW YORK CITY T... | NY | - - - - | T-E | BOND | HEALTH CARE | | | GOLDMAN SACHS |
| THU 5/3 [11:20] (NEW) | 525,000 | NORTH CAROLIN... | NC | - - - - | T-E | BOND | HEALTH CARE | | | WELLS FARGO SECS |
| THU 5/3 | 230,000 | SOUTHERN CALI... | CA | - AA- - - | T-E | BOND | TRANSPORTA... | | | JP MORGAN |
| THU 5/3 | 138,500 | NORFOLK ECON... | CA | - AA-* - - | T-E | BOND | HEALTH CARE | | | BARCLAYS CAPITAL |
| THU 5/3 | 86,000 | CALIFORNIA STA... | KS | Aa1 - AA - | Aa T-E | BOND | ECONOMIC... | | | BA MARRILL LYNCH |
| THU 5/3 | 73,320 | CUCOMONGA CA... | PA | AA - AA* - | Aa T-E | BOND | HEALTH CARE | | 1930 | BA MARRILL LYNCH |
| THU 5/3 | 50,000 | MONTOGMERTY C... | CO | - AA+ AA+ - | T-E | BOND | TRANSPORT... | | | BA MARRILL LYNCH |
| THU 5/3 | 46,000 | EVERGREEN SCHO... | TX | Aa1 - AA - | AA T-E | BOND | UTILITIES | | | SOTOL NICOLAUS |
| THU 5/3 | 39,000 | CHEROKEE COUNT... | FL | AA1* - AA+ - | AA T-E | BOND | HEALTH CARE | | | CITIGROUP |
| THU 5/3 [10:30] | 38,275 | UNITED SCHOOL D... | CA | - AA - - | AA Tax | BOND | UTILITIES | | 1931 | GEROGE K BAURN |
| THU 5/3 | 37,000 | VERMONI STUDEN... | CA | - - - - | AMT | BOND | HEALTH CARE | | | BA MARRILL LYNCH |
| THU 5/3 | 30,975 | GREATER JASPER... | ID | - AA - - | T-E | BOND | UTILITIES | | | SOLLEL NICOLAUSE |
| THU 5/3 [10:30] | 30,765 | MONROE COUNT... | OH | - AA* - - | T-E | BOND | HEALTH CARE | | | |
| THU 5/3 [10:00] | 30,000 | MADISON COUNT... | PA | AA - - - | T-E | BOND | TRANSPORT... | | | RAYMOND JAMES |

$750,000,000 NEW YORK CITY TRANSISITIONAL FINANCE AUTHORITY
FUTURE TAX SECRED SUBORDINATE BONDS
PACEL 2016 SERIES A-1

○ EXPECTED
NEGOTIATED PRICING DATE: SEPT 22, 2015

☆ FOLLOWING   ⊙ COMMENTS □   ⊕ EXPORT

SUMMARY   WIRES □   POS   ANALYTICS

ISSUER SUMMARY
STATE: NY
OBILPOR: -
CUSP ROOT: 458*0_3
PURPOSE: TRANSPORATION
SECTOR:
SUBSECTOR: TOLL ROAD

DEAL SUMMARY
TAX TYPE: TAX-COVERAGE
BOND TYPE: FLAT RATE
SECURITY TYPE: BOND
SOURCE OF REPAYMENT: REVENUE

RATINGS
MOODY'S: [Aa1] STB
S&P: [AA*] MEG
FITCH:
CROLL: [AA] POS
INSURANCE: [AA] POS
VARIED

DATES
DATED DATE: 5/8/2018
DELIVERY DATE: 5/8/2018
AWARD DATE: 5/3/2018
SALE DATE: 5/2/2018
TRADE DATE: 5/3/2018

PLAYERS
SYNDICATE: GOLDMAN SACHE   VIEW ALL
FA: PUBLIC RESOUCES ADVISORY GROUP VIEW ALL
BOND COUNSEL: ORICK HERINGTON & SUNLIFE VIEW ALL

DEAL AMERITILZATION (bar chart from 6/17 through 8/24)

— 20100

$325,000,000 SERIES 2018A REVENUE BONDS
TAX TYPE: TAX-EXEMPT  BOND TYPE: FIXED RATE  GENERAL USE OF PROCEEDS: GENERAL PURPOSE/PUBLIC IMPROVEMENTS  BQ: NO
MOODY'S:[Aa1] SAP.:[AAA] FITCH:[AA] KROLLS[AA]

| MAURITY DATE | PAR | BALANCE | COUPON | YIELD | PRICE | YTM | MMD SPREAD | INSURANCE | CUSIP SUFFIX |
|---|---|---|---|---|---|---|---|---|---|
| 8/1/2017 | 24,995 | 20,995 | 5.000 | 0.550 | 106.129 | 2.280 | 2 | | 6*91WWJ5 |
| 8/1/2018 | 2,420 | 2,420 | 3.000 | 0.580 | 108.901 | 2.280 | 4 | | 6*91WWN7 |
| 8/1/2018 | 8,375 | 6,000 | 5.000 | 0.580 | 111.425 | 2.110 | 8 | | 6*91WWH9 |
| 8/1/2019 | 1,005 | 0 | 3.000 | 1.200 | 104.732 | 2.110 | 12 | | 6*91WMM9 |
| 8/1/2019 | 8,915 | 0 | 5.000 | 1.200 | 114.213 | 1.940 | 16 | | 6*91WWG1 |
| 8/1/2019 | 5,000 | 2,500 | 4.000 | 1.490 | 111.674 | 1.940 | 20 | | 6*91WWL1 |

FIG. 20 ized and specifically designed graphical user interface.

GRAPHICAL USER INTERFACE TO TRACK DYNAMIC DATA

CROSS-REFERENCE TO RELATED APPLICATIONS

This application is a continuation application of U.S. application Ser. No. 17/319,715, filed May 13, 2021, which is a continuation application of U.S. application Ser. No. 16/783,014, filed Feb. 5, 2020, which is a continuation-in-part application of U.S. application Ser. No. 16/407,069, filed May 8, 2019, which is a continuation application of U.S. application Ser. No. 15/815,329, filed Nov. 16, 2017, which claims priority to U.S. Provisional Patent Application Ser. No. 62/424,239, filed Nov. 18, 2016, all of which are hereby incorporated by reference in their entirety for all purposes.

TECHNICAL FIELD

The present invention relates to graphical user interfaces and, more particularly, to systems and methods for monitoring multiple transactions via a centralized and specifically designed graphical user interface.

BACKGROUND

User interfaces for securities syndicate issuer applications have been historically very data driven. Conventional and existing user interfaces display securities syndicate data using columns and/or rows of data and text. Security syndicate issuers typically monitor transactions as they are occurring. High-pressure environments, where time is of the essence, causes the visual representations of the data to be essential on a transaction or offering day.

FIG. 1 illustrates a conventional graphical user interface with tabular data. FIG. 1 illustrates a graphical user interface display (GUI 100) of an Industrial Development Board in a city, such as Indianapolis, Indiana. GUI 100 displays the amount of the bonds in each maturity as well as the orders received in a tabular form. A lead manager or an issuer acting as a user, for example, may indicate to the system or request to categorize the data by case, priority, total member, non-retail or other desired category. The user may then have to view additional details in each category and extract the underlying data.

For example, as illustrated in FIG. 1, different maturities are presented in rows. Under Series 2016A (in section 120), the GUI 100 presents a maturity date of December 2035 on the first line. Further, more information is presented within the row of that maturity. For example, GUI 100 only lists the amount of bonds and the coupon rate (e.g., for the December 2035 maturity, 27,635 bonds have been sold with a coupon rate of 5). This data is tabular and time consuming to digest for a manager or an issuer. Issuers are often required to assess an overall status of a portfolio in a very short period of time (e.g., three to five second test where the issuer has to assess a portfolio in three to five seconds). Given the amount and complexity of transaction data presented in GUI 100, it is nearly impossible to visually analyze a portfolio when the data is presented using conventional methods.

Furthermore, modern users of electronic devices access their electronic devices for larger durations and with smaller screens. For example, social media has caused users of various systems to access their devices and webpages for hours at a time on portable electronic devices. Security syndicate issuers may similarly use their electronic devices, such as cell phones and laptops, for longer viewing periods. Conventional user interfaces that display all data in a tabular form may become difficult and inefficient to use because tabular data is more challenging to view on smaller screens.

SUMMARY

For the aforementioned reasons, there is a desire to graphically present the information in real time in an easy-to-digest form so that syndicate issuers and/or managers can view the data live in an efficient manner consistent with demands of the financial transaction trading industry.

In an embodiment, a method of displaying a graphical user interface on an electronic device, the method comprises displaying, by a server, in a first section of the graphical user interface, a plurality of selectable graphical components representing a plurality of maturity bonds of an offering, wherein each selectable graphical component represents a maturity bond from the plurality of maturity bonds, wherein each selectable component corresponds to at least one attribute associated with each maturity bond, the attribute comprising at least one of a name, date, credit rating, par amount, and sector associated with each maturity bond, and wherein when a user interacts with a first graphical component corresponding to a first maturity bond, the server dynamically updates a second section of the graphical user interface; displaying, by the server, in the second section of the graphical user interface, a plurality of time periods corresponding to a maturity date for the first maturity bond, wherein the server displays a vertical bar for each time period, a height of the vertical bar indicating a value of the maturity bond, wherein each vertical bar is divided into two areas a first area corresponding to a competitive sale of the first maturity bond; and a second area corresponding to a negotiated sale of the first maturity bond, wherein the server periodically monitors one or more offers associated with the first maturity bond and dynamically updates the second section of the graphical user interface.

In another embodiment, a computer system for displaying a graphical user interface on an electronic device, the computer system comprises the electronic device configured to display a graphical user interface; and a server in communication with the electronic device, the server configured to display in a first section of the graphical user interface, a plurality of selectable graphical components representing a plurality of maturity bonds of an offering, wherein each selectable graphical component represents a maturity bond from the plurality of maturity bonds, wherein each selectable component corresponds to at least one attribute associated with each maturity bond, the attribute comprising at least one of a name, date, credit rating, par amount, and sector associated with each maturity bond, and wherein when a user interacts with a first graphical component corresponding to a first maturity bond, the server dynamically updates a second section of the graphical user interface; display in the second section of the graphical user interface, a plurality of time periods corresponding to a maturity date for the first maturity bond, wherein the server displays a vertical bar for each time period, a height of the vertical bar indicating a value of the maturity bond, wherein each vertical bar is divided into two areas a first area corresponding to a competitive sale of the first maturity bond; and a second area corresponding to a negotiated sale of the first maturity bond, wherein the server periodically monitors one or more offers associated with the first maturity bond and dynamically updates the second section of the graphical user interface.

It is to be understood that both the foregoing general description and the following detailed description are and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 1 illustrates a conventional graphical user interface displaying transaction data, according to an embodiment.

FIG. 9 illustrates a graphical user interface displaying offering data, according to an embodiment.

FIG. 13 illustrates a graphical user interface displaying offering data in a tabular form, according to an embodiment.

FIG. 19 illustrates a graphical user interface displaying customized offering data, according to an embodiment.

FIG. 20 illustrates a graphical user interface displaying customized offering data, according to an embodiment.

DETAILED DESCRIPTION

Figure 2:
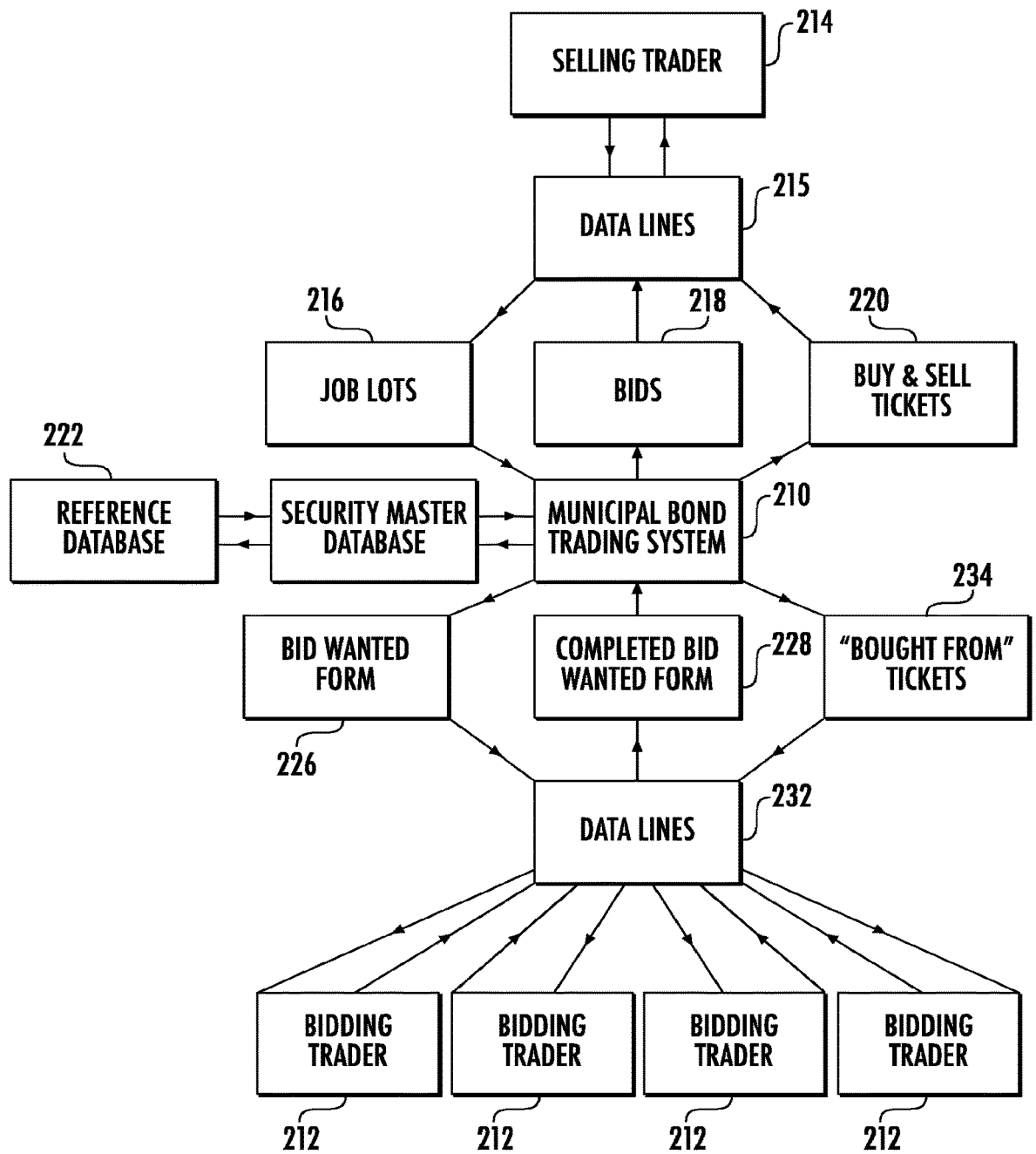
FIG. 2 illustrates an embodiment of a trading system for bond trading, according to an embodiment.

There are various types of security syndicate offerings conducted in the securities market. One type of security syndicate offering, for example, involves the sale of municipal bonds. During a security syndicate offering of municipal bonds, various transactions are conducted to solicit bids for, and facilitate the sale of the municipal bonds. These transactions can be very complex and time-consuming because the security syndicate offering can be valued at, for example, over one billion Dollars and may include multiple interconnected offerings and deals. Furthermore, processing the security syndicate offering requires interaction between a large number of participants. In general, the participants consist of the syndicate group, financial institutions, underwriters, etc. The syndicate group typically pool their resources to share the underwriting liability for a given security syndicate offering by a security issuer.

A security syndicate offering can include, for example, four general transaction periods, namely communication, pricing, order, and allotment. During the communication period, information regarding the details of the security syndicate offering, for example, is communicated to all members of the syndicate. Once the information has been received, the syndicate members make a commitment to purchase a portion of the transaction value. The pricing period represents, for example, the time it takes to negotiate or otherwise arrive at the terms for purchasing the security syndicates. For example, the terms can include the interest rates, maturities, etc. The order period begins after the pricing. During the order period, the syndicate members use their sales forces to contact financial institutions, asset managers, individual investors, etc. to solicit orders for the sale of the security syndicates. Finally, there is the allotment period, wherein a syndicate manager makes a decision as to which orders will be filled (e.g., processed). This is necessary because there are times when the syndicate members receive more orders than the value of the security syndicate offering.

Transactions conducted during the security syndicate offering can have various degrees of importance to both syndicate and non-syndicate members. One such party (or member) is the security syndicate issuer. The issuer is the person, entity, municipality, etc. offering the security syndicates for sale. The issuer is particularly interested in the order period. The order period can provide an indication of how the security syndicates are selling. This will allow the issuer to know if the security syndicates were appropriately priced and whether the syndicate members will be able to complete the sale of the security syndicate offering.

Traditionally, the issuer would periodically contact a lead syndicate member (e.g., a senior manager) and request an update on the number of bonds that have been sold. Availability of a senior manager depends on the type of security syndicate offering. In a negotiated bond offering, for example, there is only one senior manager responsible for overseeing the entire deal. In a competitive bond offering, multiple senior managers can share responsibility for overseeing the deal.

The frequency with which the issuer contacts the senior manager depends, in part, on the particular issuer. For example, one issuer may contact the senior manager two or three times throughout the day, while another issuer may contact the senior manager every hour or even more frequently. Another factor affecting the issuer is the speed at which the bonds are being sold. For example, the same issuer may contact a senior manager more frequently if the bonds do not appear to be selling quickly. In competitive deals, the issuer may contact multiple, or all, senior managers to determine status information on the deal.

The process of contacting a senior manager (or multiple senior managers) can be very time-consuming and tedious. For example, the senior manager must be prepared to provide updated information regarding sale of the bonds.

Since the information may be changing dynamically, the senior manager must also devote time to tabulating the information. Consequently, resources will not be available to market and solicit the sale of bonds.

Various electronic systems currently exist for trading bonds and managing transactions associated with bond trading. For example, U.S. Pat. No. 5,915,209 (the '209 patent) to Lawrence, incorporated herein by reference in its entirety, discloses a computer-implemented bond trading system. The system attempts to facilitate a private auction of bids between a central brokers' broker and multiple prospective bidders and to maintain a reference database of accurate bond lot descriptions.

Reference will now be made to the embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

FIG. 2 is an embodiment of a system for bond trading. As illustrated in FIG. 2, a software-enabled, computer-implemented municipal bond trading system 210 is provided for use by SEC-registered municipal bond brokers firms to serve the community of SEC-registered securities brokerage firms who deal with the public, such as selling traders 214 and buying traders 212, for executing transactions in unlisted securities, especially municipal bonds, without disclosing the seller to the prospective buyer. The municipal bond trading system 210 enables a broker who deploys it to perform a centralized market-making function in a manner providing many of the advantages of a live exchange such as the New York Stock Exchange, without, in preferred embodiments, requiring an exchange license. Although the municipal bond trading system 210 is shown in FIG. 2 as occupying a central function between sellers such as selling trader 214 and buying traders 212, the municipal bond trading system 210 can include components running at the premises (e.g., a software component executing on computing devices) of buying traders 212 and at the premises (e.g., a software component executing on computing devices) of selling traders 214 to integrate both sellers and prospective buyers into a coherent market-making system.

A job lot 216 comprises a list of one or more bond lots, each of which is a bid wanted, offering or a dollar bond quote. "For sale" is an industry phrase that means that a seller has accepted a bid at a level reasonably close to the lot's value and will execute on the bid. A selling trader 214, who may be an owning institution or individual but is preferably an SEC-registered securities broker dealer, transmits one or more job lots 216 of bonds for sale to the municipal bond trading system 210 maintained by a broker, who functions as a "market-maker," at any time convenient to the selling trader 214. Transmission of job lots 216 to the municipal bond trading system 210 can be electronically effected in a file that can be directly processed by the municipal bond trading system 210 via confidential e-mail, as are communications from the market maker to the seller, over data lines 215. The seller can be computer-linked to the municipal bond trading system 210 on a LAN or a WAN.

After appropriate central processing employing the municipal bond trading system 210, bid wanted forms are circulated to buying traders 212 in order to solicit bids 218. Bids 218 are received from one or more buying traders 212 and transmitted to the seller by any suitable means, such as electronic transmission to the seller's computer device. If the selling trader 214 accepts the bid 218, the brokers' broker marks the lot "for sale" and completes the execution, preferably with the assistance of the municipal bond trading system 210, and then transmits customary buy and sell tickets to the selling trader 214 for their internal processing. If traders are utilizing the system on their workstations, they will execute a "buy" utilizing the program while the broker executes a "sell."

The municipal bond trading system 210 can be operated as an exchange, providing a direct transaction between a selling trader 214 and a buying trader 212, conducted through the intermediary of the municipal bond trading system 210. The double step required in conducting a buy-sell transaction with both the selling trader 214 and the buying trader 212, could be eliminated. The municipal bond trading system 210 may also receive bid-wanted forms in electronic form, without vocal communication, and system-select the best bid for entry and referral to the selling trader 214 for acceptance, which electronic non-vocal automated trading procedure currently requires an exchange license. The municipal bond trading system 210 can be tailored to transmit information of the transaction to the trader's in-house processing system for proper record keeping and accounting and to maintain an inventory of bond lots in position for the trader.

The municipal bond trading system 210 herein facilitates fulfillment of this requirement by enabling rapid distribution of job lots 216 to a wide base of customers, selling traders, and by providing quick and efficient means for evaluating, collating and transmitting even a large number of bids 218 to the seller for further action. Before a trade is executed, a municipal bond lot must be identified with a Central Unified Security Identification Process number, herein referred to as "CUSIP (trademark)" issue identification number. CUSIP is a registered trademark of the American Bankers Association ("ABA"). The bond lot must also have an authentic description and a par value, usually some thousands of dollars, describing the size of the lot. Unlisted bond descriptions are subject to change at any time. For example, bond ratings are continually changed by rating agencies, and a bond may be called in for repayment on as little as thirty days' notice. Ratings and calls are an essential part of the description of a security and can dramatically affect the character of the investment. It is accordingly highly desirable to include such changes of description in each bid wanted form before distributing it, which presents a problem.

To provide contemporaneous descriptions rapidly, in a manner suitable for processing lots in volume, a security master database 224 is provided, wherein bond descriptions are stored cumulatively, whenever the municipal bond trading system 210 encounters them, to be available for future use. The security master database 224 can be primed or supplemented with preferred lists of bond descriptions and has no particular limits, but it is much smaller than the reference database 222, thus enabling a faster search and access capability. For municipal bond trading, the reference database 222 is preferably the KIS database.

Once prepared, the bid wanted form 226 is distributed to the buying traders 212 to enable them to bid in a timely manner. Bids are first solicited, and if necessary, collected centrally, and then evaluated to determine the high bidder. Following this process, a compilation of bids is transmitted to the selling trader 214 for action. These steps are accomplished in a silent auction, conducted electronically or on paper without the necessity of voiced person-to-person communication modes, such as telephone calls. In this silent auction, each bid wanted is provided with a bidding deadline and is broadcast to reach multiple buying traders 212 prior to that bidding deadline. Buying traders 212 wishing to bid on the lot offered are required to return a completed bid wanted form 228 to the municipal bond trading system 210 prior to the deadline if the bid is to be considered. Bidding closes when the deadline passes. After acceptance of a high bid by the selling trader 214 and the completion of any closing formalities, a bought-from ticket 234 is system-prepared and transmitted to the buyer for their records and processing, preferably electronically.

Buying traders 212 are linked to the municipal bond trading system 210 over a computer network so that bidding deadline alerts can be overlaid, or otherwise displayed on a buying trader's screen at various times throughout the auction process to advise of the approaching commencement of an auction on a particular lot, to warn of expiration of the time limit, and to provide interim advisories as the auction proceeds. Such alerts are preferably displayed on a system-wide basis on all selected and operational networked screens including those of brokers working with other applications on-screen at the time. If desired, bidding trader modules of the municipal bond trading system 210 can include switches or filters permitting the user to choose which alerts should be flashed on-screen or which should be allowed to interrupt other applications.

An on-screen bidding advisory message requires action by the buying trader 212 to remove it, such as pressing a particular key, and the advisory may include options (e.g., "Display bid wanted form?") if the form is not already on-screen. The system utilizes electronic transmissions of bid wanted forms 226 to a specified group of buying traders 212 who can receive the bid wanted form 226 electronically. This method of transmission is also suitable for distributing bid wanted forms 226 to any buying trader 212. In preparing job lots 216 for electronically broadcasting, the municipal bond trading system 210 organizes all active job lots 216 in a queue so that the broker can designate, or "tag," selected lots for electronic transmission. The system sorts the tagged lots for electronic transmission by auction time, and transmits them at predetermined interval before the auction commences.

The bid wanted form 226 contains the full particulars of each bid wanted lot, including its CUSIP (trademark) number and description, state of origin, maturity, par amount, and coupon values (yield and concession particulars, net yields, and dollar, gross and net dollar price) if appropriate. For use in an electronic marketing system, the form preferably also includes blank online forms to be completed by a bidding trader with bid particulars, yield, dollar or other amount, as appropriate, and bidder identifiers, including the name of the bidding trader. Yields and other calculable values can of course be system-calculated and automatically posted from base data. A buying trader 212 can quickly write minimal bid information on a hard copy of such a bid wanted form 226, sign it, and electronically transmit it back to the market-maker, who receives a signed bid with full and accurate lot particulars complying with regulatory requirements and which does not need to be checked, verified or completed.

Figure 3:
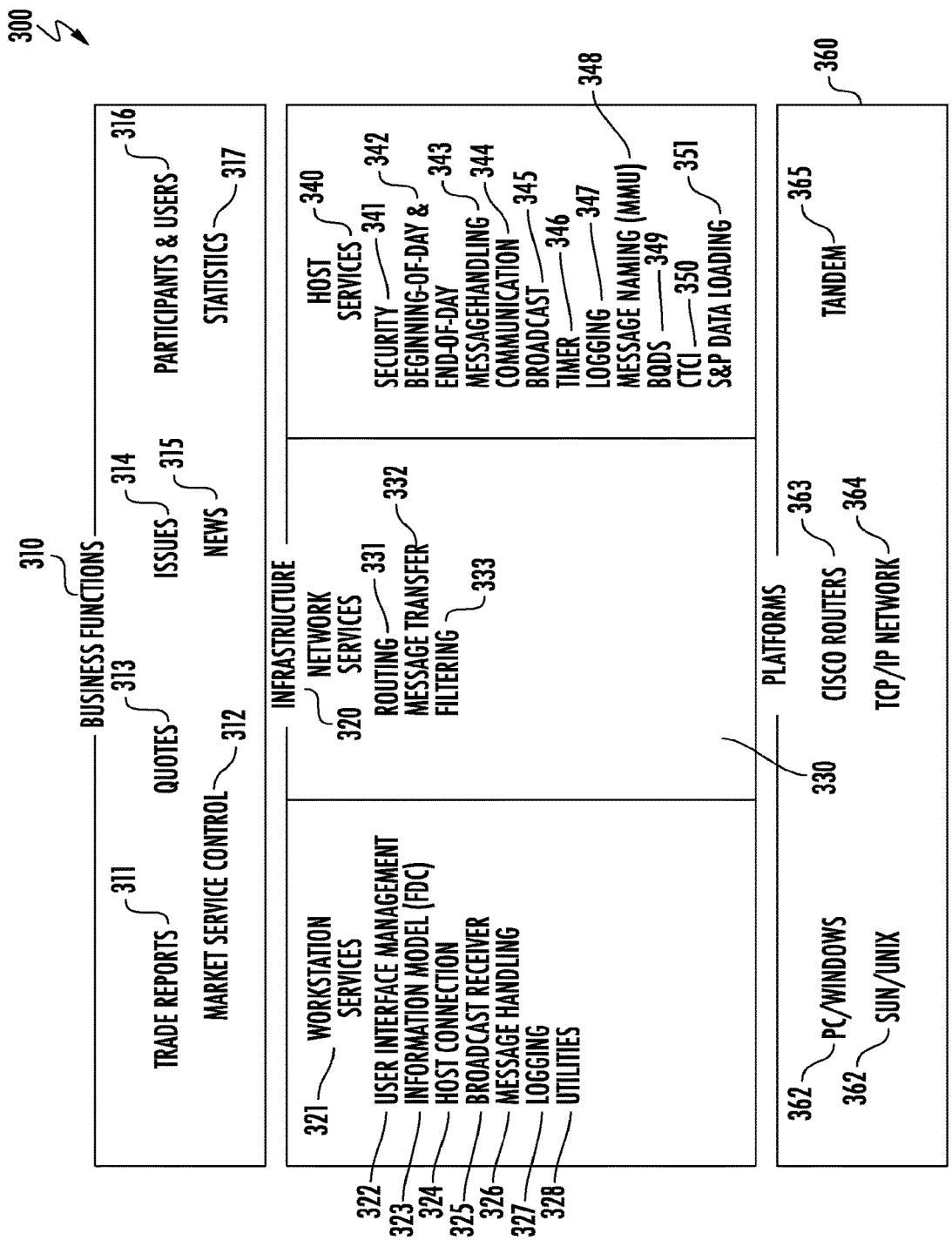
FIG. 3 illustrates an embodiment of fixed income pricing system (FIPS), according to an embodiment.

U.S. Pat. No. 5,809,483 issued to Broka et al., incorporated herein by reference, discloses an on-line transaction processing system for bond trading. The system allows for monitoring of information regarding debt securities and reporting trades in the debt securities market. FIG. 3 is a reproduction of an embodiment of fixed income pricing system (FIPS) as disclosed in the '483 patent.

As shown in FIG. 3, the FIPS processing system 300 includes business functions layer 310, infrastructure layer 320, and platforms layer 360. Business functions layer 310 provides the basic services accessed by users and includes the following services: trade reports 311, market services control 312, quotes 313, issues 314, news 315, participants & users 316, and statistics 317.

Infrastructure layer 320 includes the communication mechanisms and other tools that allow the various FIPS processes to work together. Infrastructure layer 320 includes workstation services module 321, network services module 330, and host services module 340. Workstation services module 321 includes those services required to use a workstation and include user interface management 322, information model 323, host connection 324, broadcast receiver 425, message handling 326, logging 327, and utilities 328.

Network services module 330 includes those services that provide access to the entire network. These include routing 331, message transfer 332, and filtering 333. Host services module 340 includes those services provided for the FIPS host and include: security service 341, beginning-of-day & end-of-day 342, message handling 343, communication service 344, broadcast service 345, timer 346, logging 347, message naming 348, bond quotation dissemination system (BDQS) 349, computer-to-computer interface (CTCI) 350, and standard & poor's (S&P) data loading 351.

During most system interactions, one of the services in infrastructure layer 320 will interact with one of the functions in business functions layer 310. For example, the security service 341 works with the participant & user 316 to authorize and authenticate users when they log on. Different services in infrastructure layer 320 may also communicate with each other. For example, the broadcast service 345 works with the communication service 344 to send messages to multiple platforms including PC/Windows 461 and Sun/Unix 462. Business functions layer 310 can have relationships with each other as well. For example, FIPS system administrators may use market service control 312 with the trade reports 311 to restrict a user's ability to generate trade reports.

The previously described features are beneficial for addressing specific problems in the financial market. For example, FIG. 3 addresses problems associated with monitoring debt security information and reporting trades in the debt securities market. Embodiments allow an issuer to view (on a computing device) the progress of sales of security syndicates or access information conventionally available only from a senior manager.

The detailed descriptions that follow may be presented in terms of program procedures executed on a computer or network of computers. These procedural descriptions and representations are the means used by those skilled in the art to efficiently convey the substance of their work to others skilled in the art.

Figure 4A:
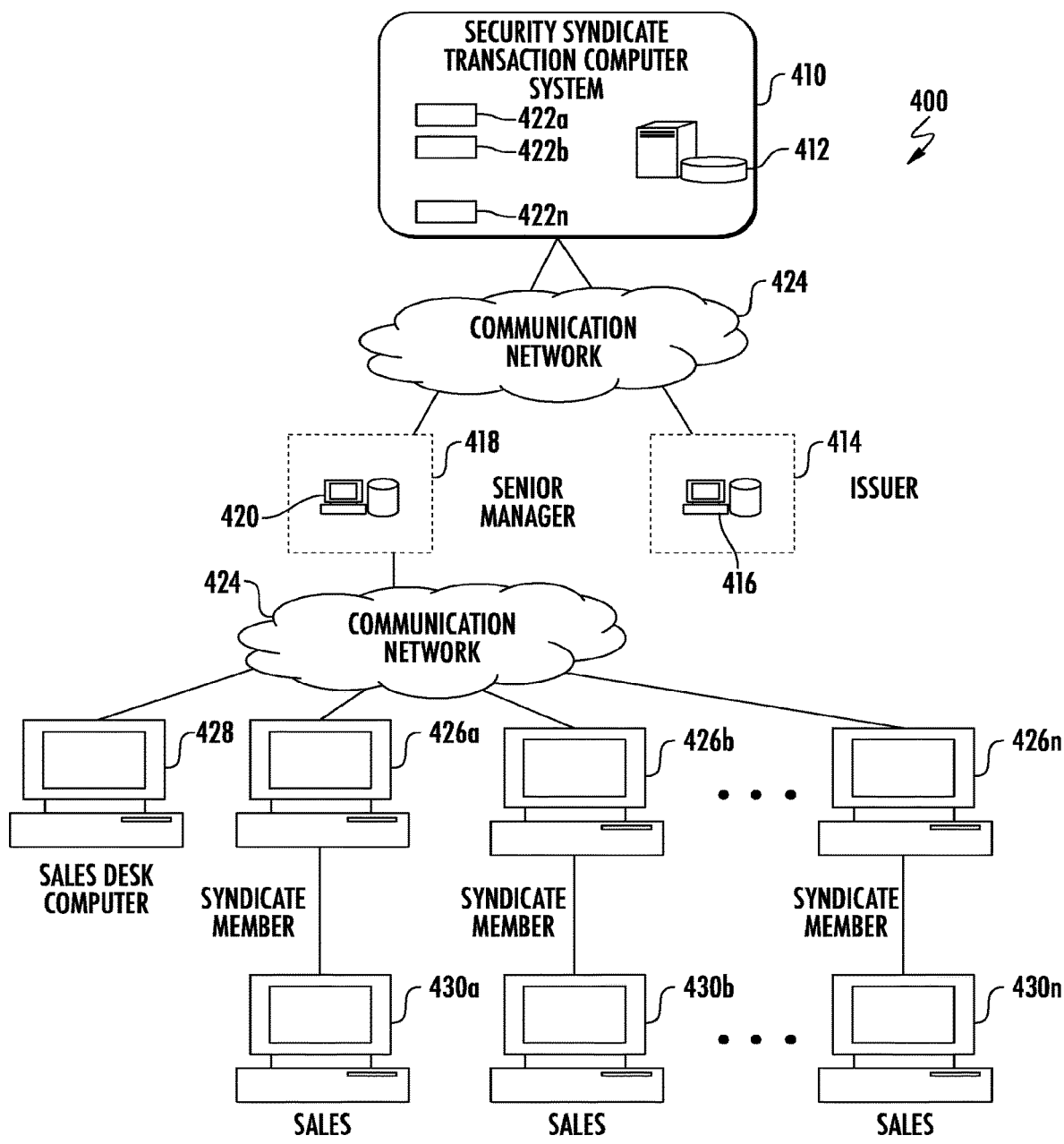
FIGS. 4A-C illustrate a transaction monitoring computer system, according to an embodiment.

Referring now to FIG. 4A, a transaction monitoring computer system 400 is shown for monitoring the flow of transactions during a security syndicate offering. The transaction monitoring computer system 400 (or issuer monitor) includes a security syndicate transaction computer system 410, an issuer computer system 414, and a senior manager computer system 418. The senior manager computer system is in network connection with the other computing systems and devices, such as syndicate members 426, sales/senior manager computer 420, and sales computer devices 430. The security syndicate transaction computer system 410 contains a plurality of subsystems, such as the illustrated webserver 412 and the processing subsystems 422a-422n (collectively 422). The webserver 412 may be a server configured to generate different graphical user interfaces and display them on different computing devices described herein. The processing subsystems 422 may process information pertaining to all transactions performed during the security syndicate offering (e.g., collect, analyze, and store all transaction data pertinent to the security syndicate offerings).

In an embodiment, the webserver 412 and the processing subsystems 422 each comprise a processor and a non-transitory computer readable medium comprising a set of instructions that are configured to be executed by each processor to display the graphical user interfaces described below (FIGS. 7-18). Each instruction within the set of instructions may command and cause a different module of the webserver 412 or processing subsystems 422 to display a particular section or container of the graphical user interfaces described below. For example, a first instruction may instruct (e.g., command or cause) a first module of the webserver 412 to query pertinent data from the processing subsystems 422 and display a first section of a graphical user interface (e.g., GUI component 770 described in FIG. 7); and a second instruction may instruct a second module of the webserver 412 to query pertinent data from the processing subsystems 422 and display a second section of the graphical user interface (e.g., GUI component 780 described in FIG. 7). Although described herein as separate modules, it is intended that these modules can be configured as at least one module.

The processing subsystems 422 and the webserver 412 may be database servers comprising a processor capable of performing the various tasks and processes described herein. Non-limiting examples of the processing subsystems 422 and the webserver 412 may include a server, desktop, laptop, tablet, and the like. The processing subsystems 422 and the webserver 412 may comprise any number of computer-networking components (e.g., network interface card) that facilitate inter-device communications via the communication network 421. One having skill in the art would appreciate that there may be any number of distinct computing devices functioning as the processing subsystems 422 or the webserver 412 in a distributed computing environment. The webserver 412 may host an online service, such as cloud-computing application service, or any other service that provide customer-facing web-based applications that collect transaction data through web-based client interactions over one or more networks such as the communication network 424. Simply put, the processing subsystems 422 may collect and analyze transaction data and the webserver 412 may generate and display or display different graphical user interfaces on different computing devices described herein.

Even though FIG. 4A illustrates the processing subsystems 422 and the webserver 412 as separate computing features, in some embodiment, they may be functionally combined together. In other words, the security syndicate transaction computer system 410 may only comprise one server that performs as both the processing subsystems 422 and the webserver 412. The security syndicate transaction computer system 410 can also include a computer (not shown) functioning as a server for interacting with both internal and external subsystems. In operation, the security syndicate transaction computer system 410 is a computing system (comprising multiple servers, computers, and databases) that monitors the security syndicate offering and generates multiple graphical user interfaces (described below) and display/render them on computing devise described within FIG. 4A.

As used herein, a security syndicate refers to financial securities (or other financial instruments) offered for sale, and subsequently sold to buyers. A security syndicate offering refers to any procedure during which the security syndicates are offered for sale to generate funds and/or revenue. The financial instruments include, but are not limited to, municipal bonds, short-term bonds, long-term bonds, stocks, etc.

The issuer computer system 414 and senior manager computer system 418 comprise at least one computer system such as issuer's computer 416 (operated by an issuer) and senior manager computer 420 (operated by a senior manager) and a local database to store transaction data. The issuer computer system 414 and senior manager computer system 418 may comprise multiple computers operated by multiple issuers and managers; these computers are not all shown for clarity. The issuer's computer 416 and senior manager computer 420 may execute predetermined program commands for interfacing with the security syndicate transaction computer system 410 for participating in the security syndicate offering. Issuer's computer 416, syndicate members 426a-426n, sales desk computer 428, sales computer device 430, and senior manager computer 420 may be any electronic device suitable for displaying graphical user interfaces for a user, such as a workstation, desktop computer, laptop computer, smart phone, tablet computer, smart watch, or the like. The issuer computer system 414 and senior manager computer system 418 access the security syndicate transaction computer system 410 over the communication network 424 such as, for example, the Internet to access the graphical user interfaces provided by the security syndicate transaction computer system 410. It should be noted, however, that various other networks could be used including, but not limited to, direct-dial closed networks, private local area networks (LANs), wide area networks (WAN), etc.

During the security syndicate offering, the issuer computer system 414 offers one or more security syndicates for sale. This offer can be presented in various forms, including an electronic message communicated to the security syndicate transaction computer system 410. The electronic message would contain all the necessary information for processing the security syndicate offering and subsequently selling the security syndicates (e.g., financial instruments). The information may be stored on the processing subsystems 422 where it can be restrictively accessed by the senior manager computer system 418. The webserver 412 can control the restrictive access, for example, by means of a username and password that uniquely identifies the senior manager computer system 418. Thus, it is possible for the transaction monitoring computer system 400 to support multiple senior manager computer systems and multiple issuer computer systems simultaneously interacting with the security syndicate transaction computer system 410. Each senior manager computer system 418 and/or issuer computer system 414 would be restricted to viewing security syndicate offerings of which they are a part, thus addressing privacy and/or security concerns.

The senior manager computer system 418 is part of a syndicate group containing various entities. However, the senior manager computer system 418 is responsible for managing transactions that ultimately lead to the sale of the security syndicates. Consequently, the senior manager computer system 418 may be the only entity in the syndicate group that can access the security syndicate transaction computer system 410. As previously indicated, the syndicate group includes a plurality of syndicate members 426a-426n (collectively syndicate members 426) that share liability for the security syndicate offering. The syndicate group can also include a sales desk computer 428 operated by the senior manager's staff for soliciting sale of the security syndicates from the security syndicate offerings. Likewise, the syndicate members 426 can include their own sales divisions 430a-430n (collectively sales computing devices 430) that solicit sale of the security syndicates from various institutions and/or investors. The syndicate members 426 can optionally solicit sales from the institutions directly without the use of a sales desk computer 428.

During the security syndicate offering, all data relating to the order and/or sale of the security syndicates are transmitted to the senior manager computer system 418. This information is subsequently transmitted from the senior manager computer system 418 across the communication network 424 (e.g., the Internet) to the security syndicate transaction computer system 410. The senior manager computer system 418 is also capable of transmitting information regarding the security syndicate offering to the syndicate members 426 (e.g., computer device associated with each syndicate member).

The issuer computer system 414 communicates with the security syndicate transaction computer system 410 in order to monitor transactions being conducted during their particular security syndicate offerings. As previously stated, the senior manager computer system 418 transmits data corresponding to such transactions to the security syndicate transaction computer system 410. Accordingly, this information is accessible by the issuer computer system 414 in order to monitor the security syndicate offering. The data corresponding to the transactions is preferably displayed on the issuer's computer 416 and automatically updated in real time. For example, every time the senior manager computer system 418 transmits information to the security syndicate transaction computer system 410 regarding a transaction, that data would be automatically transmitted to the issuer's computer 416 to update the records. Alternatively, the issuer computer system 414 can manually select to update information regarding the security syndicate offering. Such a procedure would cause the issuer's computer 416 to transmit a message to the security syndicate transaction computer system 410, and access the most recently uploaded data using variety of the graphical user interfaces provided by the security syndicate transaction computer system 410.

According to one embodiment, the issuer's computer 416 can be configured to correlate data received from the security syndicate transaction computer system 410 and generate reports that represent the progress of transactions during the security syndicate offering. The reports can be in various forms including, for example, tables, graphs, etc. In addition, the issuer's computer 416 can be optionally configured to process the data received from the security syndicate transaction computer system 410 and identify certain trends such as a reduction in the rate of orders being submitted, an increase in the rate of orders being submitted, a change in the relative distribution of orders being received, etc. The trends can be generally considered as indicators of the progress of the security syndicate offering. Based on these identified trends, the issuer computer system 414 can optionally contact the senior manager computer system 418 in order to incorporate changes designed to achieve predetermined results. For example, if an identified trend shows that the number of orders being received, or the rate at which orders are being received is going down, the issuer computer system 414 may wish to contact the senior manager computer system 418 to discuss a change in pricing that would make the security syndicates more attractive to buyers and/or investors. For example, if the security syndicates are municipal bonds, the issuer computer system 414 might suggest a reduction in the interest rate and/or a change in the maturity structure of the bonds. In essence, the issuer computer system 414 will attempt to identify negative trends (using the graphical user interfaces described below) in the sale of the security syndicates, and take appropriate steps to correct those trends. Similarly, if the issuer computer system 414 determines the rate of sale of the security syndicates to be too high, the issuer computer system 414 may contact the senior manager computer system 418 and, for example, increase the interest rate of the bonds.

In operation, the webserver 412 may be in communication with all the computing entities described herein in order to provide the latest and most accurate transaction information to all the parties. The webserver 412 may query the latest data from the processing subsystems 422 and generate a variety of graphical user interfaces (e.g., FIG. 7-FIG. 11) displayed on computing devices operated by the parties described herein (e.g., issuer's computer 416). For example, the processing subsystems 422 may collect and analyze transaction prices from the issuer computer system 414 and display different graphical user interfaces on computing devices operated by the senior managers, syndicate members, and sales members. Upon receiving any modification data (e.g., a bid, order, counter offer, and the like) the processing subsystems 422 may then modify the transaction data and the webserver 412 may display a new graphical user interface (or update the same GUI in real time) using the updated transaction data and display said data on the issuer's computer 416. The webserver 412 may continuously update the graphical user interfaces displayed on computing devices operated by different parties. In this way, all parties described herein may have access to the latest and most accurate transaction data displayed on a specifically designed easy-to-digest graphical user interface. The webserver 412 is also configured to provide raw data (presented in tabular form) upon the issuer's request.

The processing subsystems 422 are also configured to collect and store all transaction data in a local or remote database. The processing subsystems 422 may monitor all transaction modifications (price modifications by the issuer computing system 414, bids received from the sales computing devices 430 or syndicate member 426, and communications between all the parties described herein). The processing subsystems 422 may generate a deal dataset for each deal (e.g., syndicate offering) and store the above-mentioned data as metadata within the deal dataset. The processing subsystems 422 may also store additional data, such as an economic calendar including market conditions, price tickers, geographic location of the bidders and buyers, and the like within the above-mentioned dataset. In this way, a party with access to a deal dataset (e.g., a deal snapshot) is able to review a thorough history of the deal from the beginning (e.g., when the issuer indicates the initial price) to the end (e.g., when the syndicate offering is terminated and maturities are sold).

Figure 4B:
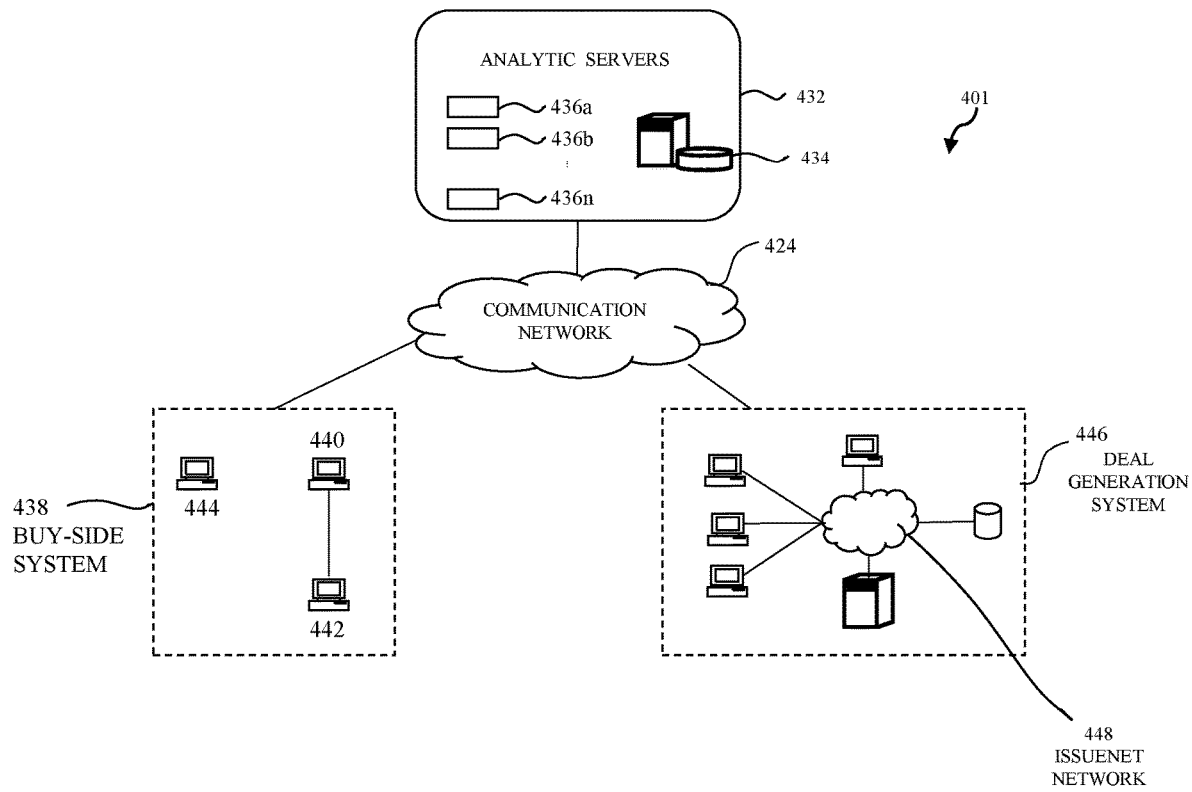
Figure 4C:
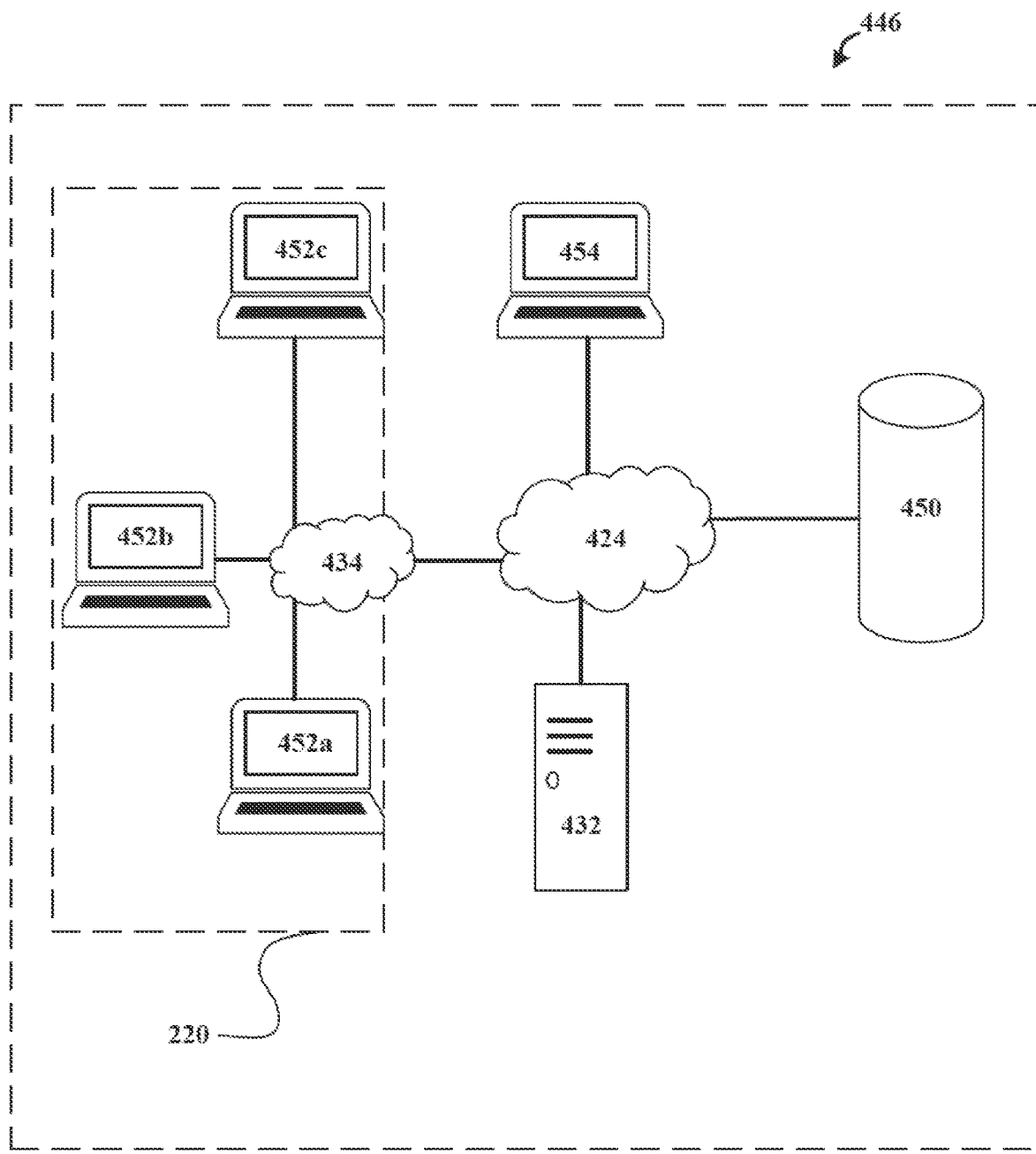

Referring now to FIGS. 4B-C, a transaction monitoring computer system 401 is shown for monitoring the flow of a deal from issuance of the deal and during a security syndicate offering of the issued deal. The computer system 401 is another embodiment of the computer systems used to issue, monitor, and purchase various deals (offerings). The computer system 401 does not deviate from the methods and systems described herein.

The transaction monitoring computer system 401 (sometimes called "investor access") may include analytic servers 432, a deal generation system 446 (described in detail in FIG. 4C), an IssueNet network 448, and a buy-side system 438, which may include investor computer device 444, API 440, and investor computer device 442. The analytic servers 432 may contain a plurality of subsystems, such as the illustrated webserver 434 and the processing subsystems 436a-436n (collectively processing subsystems 436). The webserver 434 may be a server configured to generate different graphical user interfaces and display them on different computing devices described herein. The processing subsystems 436 may process information pertaining to all deals and transactions (e.g., collect, analyze, and store all transaction data pertinent to the security syndicate offerings). The webserver 434 and the processing subsystems 436 are collectively referred to as the analytic servers 432.

In an embodiment, the webserver 434 and the processing subsystems 436 each comprise a processor and a non-transitory computer readable medium comprising a set of instructions that are configured to be executed by each processor to display the graphical user interfaces described below. Each instruction within the set of instructions may command and cause a different module of the webserver 434 or processing subsystems 436 to display a particular section or container of the graphical user interfaces described below. For example, a first instruction may instruct (e.g., command or cause) a first module of the webserver 434 to query pertinent data from the processing subsystems 436 and display a first section of a graphical user interface; and a second instruction may instruct a second module of the web server 434 to query pertinent data from the processing subsystems 436 and display a second section of the graphical user interface. Although described herein as separate modules, it is intended that these modules can be configured as at least one module.

The processing subsystems 436 and the webserver 434 may be database servers comprising a processor capable of performing the various tasks and processes described herein. Non-limiting examples of the processing subsystems 436 and the webserver 434 may include a server, desktop, laptop, tablet, and the like. The processing subsystems 436 and the webserver 434 may comprise any number of computer-networking components (e.g., network interface card) that facilitate inter-device communications via the communication network 424 or the IssueNet network 448.

There may be any number of distinct computing devices functioning as the processing subsystems 436 or the webserver 434 in a distributed computing environment. The webserver 434 may host an online service, such as cloud-computing application service, or any other service that provide customer-facing web-based applications (e.g., various graphical user interfaces described below) that collect transaction data through web-based client interactions over one or more networks such as the communication network 424. Simply put, the processing subsystems 436 may collect and analyze transaction data and the webserver 434 may generate and display or display different graphical user interfaces on different computing devices described herein.

Even though FIG. 4B illustrates the processing subsystems 436 and the webserver 434 as separate computing features, in some embodiment, they may be functionally combined together. In other words, the analytic servers 432 may only comprise one server that performs as both the processing subsystems 436 and the webserver 434. The analytic servers 432 can also include a computer (not shown) functioning as a server for interacting with both internal and external subsystems. In operation, the analytic server 432 is a computing system (comprising multiple servers, computers, and databases) that monitors the issuance of a deal and the security syndicate offering and generates multiple graphical user interfaces (described below) and display/render them on computing devise described herein.

As used herein, a deal refers to financial securities (or other financial instruments or offering) offered for sale and subsequently sold to buyers (e.g., bond offering). A security syndicate offering refers to any procedure during which multiple financial institutions collaboratively market and offer various types of securities for sale to generate funds. The financial instruments include, but are not limited to, corporate bonds, municipal bonds, short-term bonds, long-term bonds, stocks, etc. Even though FIG. 4B only illustrates only one investor computer device 444 directly in communication with the analytic servers 432, there may be multiple investor computer devices and sales members involved in a transaction, such as illustrated in FIG. 4A.

The deal generation system 446 refers to the computing devices involved in generating a deal, including an issuer computer device and a plurality of banking devices (collectively known as "syndicate"), and is further described in detail in FIG. 4C. The deal generation system 446 (sell side) and the buy-side system 438 may comprise multiple computers operated by multiple issuers and managers; these computers are not all shown for clarity. The computing devices associated with the deal generation system 446 and the buy-side system 438 may execute predetermined program commands for interfacing with the analytic servers 432 for participating in generating and marketing a deal and/or the security offering.

Investor computer device 444, buy-side API 440, and investor computer device 442 may be any electronic device suitable for displaying graphical user interfaces for a user operating a computing device on the buy-side 438 (e.g., investor placing an order), such as a workstation, desktop computer, laptop computer, smart phone, tablet computer, smart watch, or the like. The deal generation system 446 and the buy-side 438 may access the analytic servers 432 over the communication network 424 such as, for example, the Internet to access the graphical user interfaces provided by the analytic servers 432. It should be noted, however, that various other networks could be used including, but not limited to, direct-dial closed networks, private local area networks (LANs), wide area networks (WAN), etc.

As described above, the deal generation system 446 may contain multiple computing systems itself. For example, the deal generation system 446 may contain an issuer computer device and multiple banking computer devices. The computer devices within the deal generation system 446 may use various graphical user interfaces provided by the analytic servers 432 to collaboratively generate a deal.

Once the deal is completed (e.g., finalized and agreed upon by all collaborating parties of the syndicate 220 as described below), the deal generation system 446 may send the deal to be purchased by the buy-side system 438. The buy-side system 438 may transmit various offers from buyers, which may then be transmitted by the analytic servers 432 to the IssueNet network 448. More specifically, the analytics servers 432 may display various graphical user interfaces on any of the computing devices described herein that allows each respective user to monitor various stages of the deals.

In some other embodiments, the user operating the investor computer device 442 may use an API 440 to automatically access the deal (e.g., the deal dataset including deal attributes). For example, the user operating the investor computer device 442 may use the API 440 to automatically transmit pertinent deal data to another software program installed and executing on the investor computer device 442. In this way, even though the user operating the investor computer device 442 is not directly in contact with the analytics server 432 (e.g., may not permit the analytic servers 432 to display GUIs on the investor computer device 442), the deal dataset may be used to populate a third-party investment software.

The analytic servers 432 may control and monitor the entire process and once an offer has been accepted, the analytic servers 432 may send the deal and the offer (e.g., transmit data representing the deal and the offer) to the IssueNet network for processing.

During the security syndicate offering, the deal generation system 446 offers one or more security syndicates for sale to raise capital. This offer can be presented in various forms, including an electronic deal communicated to the analytic servers 432. The electronic message would contain all the necessary information for processing the security offering or deals and subsequently selling the security offerings or deals (e.g., financial instruments). The information may be stored on the processing subsystems 436 where it can be restrictively accessed by the investor computer devices 444 and/or 442. The webserver 434 can control the restrictive access, for example, by means of a username and password that uniquely identifies the computing devices within the buy-side system 438. Thus, it is possible for the transaction monitoring computer system 401 to support multiple sell-side computer systems and multiple deal generation systems simultaneously interacting with the analytic servers 432. Each computer device shown in FIG. 4B would be restricted to viewing security offerings or deals of which they are a part (or have legal access rights to), thus addressing privacy and/or security concerns in addition to complying with various syndicate offering regulations.

During the security syndicate offering, all data relating to the deal are transmitted (by the analytic server 432) to the buy side system 438. This information is subsequently (directly or indirectly) transmitted to the investor computer devices 444 and/or 442.

The deal generation system 446 may generate a security offering (e.g., deal or financial instrument) and then communicate the offering with the analytic servers 432 in order to monitor transactions being conducted during their deal offerings. As previously stated, the investor computer devices 444 and/or 442 transmit data corresponding to such transactions to the analytic servers 432. Accordingly, this information is accessible by the deal generation system 446 in order to monitor the deal offering. The data corresponding to the transactions is preferably displayed on any of the computing systems associated with the deal generation system 446 and may be automatically updated in real time. For example, every time the buy-side system 438 transmits information to the analytic servers 432 regarding a transaction or an offer/bid, that data could be automatically transmitted to the deal generation system 446 to update the records. Alternatively, the deal generation system 446 can manually select to update information regarding the deal offering. For example, a computer associated with the deal generation system 446 may transmit a message to the analytic servers 432 and access the most recently uploaded data using variety of the graphical user interfaces provided by the analytic servers 432.

According to one embodiment, the deal generation system 446 can be configured to correlate data received from the analytic servers 432 and generate reports that represent the progress of transactions during the deal offering. The reports can be in various forms including, for example, tables, graphs, etc. In addition, the computing devices within the deal generation system 446 can be optionally configured to process the data received from the analytic servers 432 and identify certain trends such as a reduction in the rate of orders being submitted, an increase in the rate of orders being submitted, a change in the relative distribution of orders being received, etc. The trends can be generally considered as indicators of the progress of the deal offering. Based on these identified trends, the deal generation system 446 can optionally contact any computer devices within the buy-side system 438 in order to incorporate changes designed to achieve predetermined results.

For example, if an identified trend shows that the number of orders being received, or the rate at which orders are being received is going down, the deal generation system 446 may wish to contact the any of the computing devices within the buy-side system 438 to discuss a change in pricing that would make the deal more attractive to buyers and/or investors. For example, if the financial instruments offered by the deal are municipal bonds, the deal generation system 446 might suggest a reduction in the interest rate and/or a change in the maturity structure of the bonds. In essence, the deal generation system 446 will attempt to identify negative trends (using the graphical user interfaces described below) in the sale of the security syndicates, and take appropriate steps to correct those trends. Similarly, if the deal generation system 446 determines the rate of sale of the security syndicates to be too high, the deal generation system 446 may contact investors (e.g., computing devices within the buy-side system 438) and, for example, increase the interest rate of the bonds.

In operation, the webserver 434 may be in communication with all the computing entities described herein in order to provide the latest and most accurate transaction and deal information to all the parties. The webserver 434 may query the latest data from the processing subsystems 436 and generate a variety of graphical user interfaces displayed on computing devices operated by the parties described herein. For example, the webserver 434 may display the latest deal modifications, request for approvals from the issuing computing devices in order to create a collaborative deal.

The processing subsystems 436 may collect and analyze transaction prices from the deal generation system 446 and display different graphical user interfaces on computing devices operated by the investors, syndicate members, and sales members. Upon receiving any order indication data (e.g., a bid, order, counter offer, and the like) the processing subsystems 436 may then modify the transaction data and the web server 434 may display a new graphical user interface (or update the same GUI in real time) using the updated transaction data and display said data. The webserver 434 may continuously update the graphical user interfaces displayed on computing devices operated by different parties. As a result, all parties described herein may have access to the latest and most accurate transaction data displayed on a specifically designed easy-to-digest graphical user interface.

The processing subsystems 436 are also configured to collect and store all transaction data in a local or remote database. The processing subsystems 436 may monitor all deal or transaction modifications (price modifications by the issuer computing system (e.g., deal generation system 446), bids received from the buy-side system 438, and communications between all the parties described herein). The processing subsystems 436 may generate a deal dataset for each deal and store the above-mentioned data as metadata (or store them in a plurality of data records) within the deal dataset. The processing subsystems 436 may also store additional data, such as an economic calendar including market conditions, price tickers, geographic location of the bidders and buyers, and the like within the above-mentioned dataset. In this way, a party with access to a deal dataset (e.g., a deal snapshot) is able to review a thorough history of the deal from the beginning (e.g., when the issuer indicates the initial price) to the end.

FIG. 4C illustrates components of a deal generation system 446, according to an embodiment. The issuer computer system (e.g., deal generation system 446) comprises a database 450, banking computer devices 452*a-c* (collectively banking devices 452 or syndicate members), and an issuer computer device 454. The issuer computer device 240, the banking devices 452, and the database 450 may communicate with each other via the communication network 424, such as the Internet or a private network associated with each of the above-mentioned computer devices as described in FIG. 4B. The above-mentioned computer devices are also in communication with the analytic servers 432.

In operation, the issuer computer device 454 may request the analytic servers 432 to generate a graphical user interface, receive input (e.g., data associated with the deal) and derive various forms of analytical information from the data records of the database 230 or stored in the analytic server 432 in order to generate a deal and transmit the deal to the banking devices 452*a-c*, collaboratively generate and finalize the deal, and then transmit the approved deal to the various computing devices associated with the buy-side system 438.

The database 450 may store data records that are associated with interactions between different selling and buying parties, where the data records each contain at least one field identifying which party account is associated with a particular interaction. The database 450 may also record information associated with other issuers, buyers, and investors such as sales volume, sales amount, frequency of interactions, physical location, and the like. The database 450 may also store federal regulations, and other pertinent authoritative legal information relative to the market. The database 450 may be hosted on any number of devices comprising a non-transitory machine-readable storage medium capable of storing data records received from the analytic servers 432, and in some cases, the banking devices 452 or the issuer computer device 454. The database 450 may further comprise a processor capable of executing various queries and data record management processes, according to instructions from the analytic servers 432.

One having skill in the art would appreciate that the database 450 may be hosted on a distinct device that is in networked-communication with the analytic servers 432. Even though FIG. 4C refers to the database 450 as a local database associated with the issuer computer system (e.g., deal generation system 446), the database 450 may also be functionally the same as the processing subsystems 436. For example, instead of locally saving the data onto the database 450, in some embodiments, the data may be stored onto the processing subsystems 436. In some other embodiments, the database 450 may periodically update and transmit data to the processing subsystems 436. In this way, the analytic servers 432 may have access to the latest and most updated information.

The analytic servers 432 may perform various analytics on data records stored in the database 450 or received from the banking devices 452 or issuer computer device 454 and transmit the results to any of the above-mentioned devices/parties within system 401. The analytic servers 432 may also generate multiple graphical user interfaces configured to receive data from the issuer computer device 410, generate a deal, display the deal in a collaborative platform to one or more parties (e.g., issuer computer device 454, banking devices 452, and/or any other party allowed to access the deal), permit collaboration among the parties, and finalize the deal.

In operation, banking devices 452 may access a web-based service or an application hosted by the analytic servers 432, from which users (e.g., users operating each banking device) may provide various types of data relevant to deals and/or modify deal attributes that may be stored in a local database (e.g., database 450) or the processing subsystems 436. Banking devices 452 may be any device comprising a processor capable of performing the various tasks and processes described herein. Non-limiting examples of banking devices 452 may include a server, desktop, laptop, tablet, and the like. Banking devices 452 comprise any number of computer-networking components (e.g., network interface card) that facilitate inter-device communications via the communication network 424.

The issuer computer device 454 may access a web-based service or application hosted by the analytic servers 432, from which users may provide various types of data relevant to deals, modify details regarding the deals, and/or select deals to purchase that may be stored in the database 450 or the processing subsystems 436. The issuer computer device 454 may be any device comprising a processor capable of performing the various tasks and processes described herein. Non-limiting examples of the issuer computer device 454 may include a server, desktop, laptop, tablet, and the like. The issuer computer devices 454 comprise any number of computer-networking components (e.g., network interface card) that facilitate inter-device communications via the communication network 424.

In operations, graphical user interfaces described herein may be displayed on any of the above-described computing devices. The graphical user interfaces may be customized for each particular user based on each user's role and viewing permissions.

Figure 5:
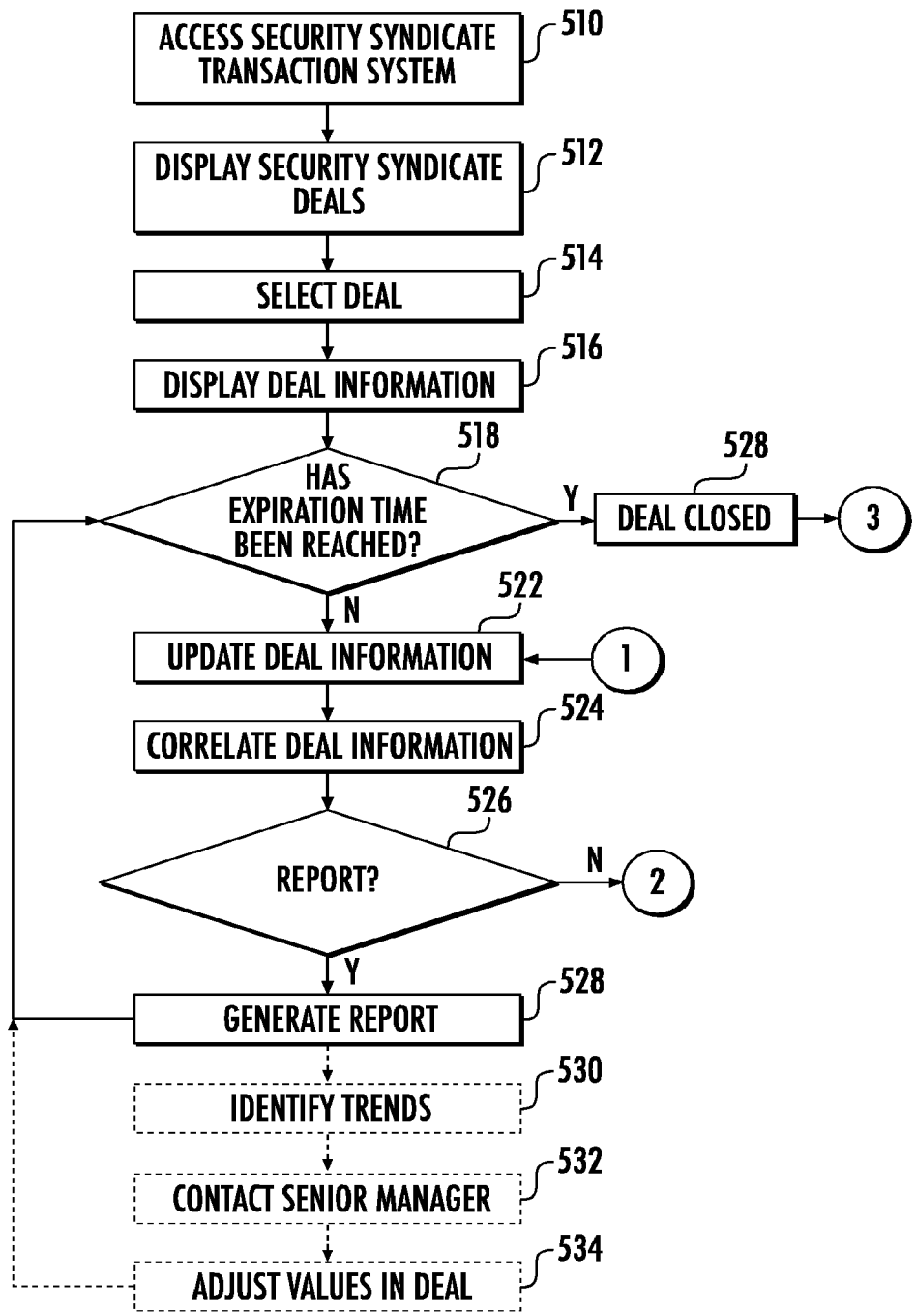
FIG. 5 illustrates steps performed when monitoring the flow of transactions during a security offering, according to an embodiment.

Referring to FIG. 5, a flowchart is illustrated for displaying steps performed when monitoring the flow of transactions during a security syndicate offering. During the security syndicate offering, the senior manager computer system 418 principally interacts with the security syndicate transaction computer system 410 and the syndicate members 426. However, the issuer computer system 414 also has an ability to monitor the transactions being conducted, as will be described further herein below. While the below described steps are in a particular sequence, it is possible to alter the sequence of steps and/or perform some or many of the steps in parallel. Further, the specific steps/systems described herein are described in connection with an issuer syndicate financial transaction. However, embodiments may easily be adapted to a variety of financial transactions, as necessary. At step 510, the issuer computer system 414 accesses the security syndicate transaction computer system 410. As previously stated, this step can be performed using the issuer's computer 416 to contact the security syndicate transaction system subsystems via the communication network 424. Upon contacting the security syndicate transaction computer system 410, the issuer computer system 414 can optionally be requested to supply a username and password that uniquely identifies the issuer computer system 414 and restricts the information accessible by the user.

At step 512, the current security syndicate offerings available from the issuer computer system 414 are displayed on the issuer's computer 416. Depending on the particular issuer computer system 414, there may be one or more security syndicate offerings available at any given time. According to one embodiment, the security syndicate offerings can be presented in the form of a calendar menu displaying one or more security syndicate offerings available from the issuer system 114. The calendar menu can also display general information regarding each security syndicate offering, such as the value, closing date, and a brief description. At step 514, the issuer computer system 414 selects a particular security syndicate offering to monitor. Depending on the particular computer software being used by the issuer computer system 414, the security syndicate offering can be selected, for example, using a graphical input/selection device such as a mouse or stylus, or by entering a predetermined keystroke or command using the keyboard.

At step 516, the issuer's computer 416 displays deal information corresponding to the selected security syndicate offering. The deal information can include, for example, the closing date, financial structure, rating, etc. for the selected deal. At step 518, it is determined whether an expiration time has been reached. The expiration time corresponds to the time at which the security syndicates are no longer available for sale. If the expiration time has been reached, then the selected security syndicate offering is identified as being closed (step 520), and control passes to block 3. If the expiration time has not been reached, then the deal information on the issuer's computer 416 (the graphical user interface displayed on the issuer's computer 416) is updated.

At step 524, data received for the deal information is correlated. Correlation of the received data can vary depending on the particular security syndicate offering and issuer computer system 414. In essence, the issuer computer system 414 is free to dictate the type of information that they seek while monitoring transactions. Thus, one issuer may desire that the correlated data quickly provide an indication of the number of security syndicates being sold. Another issuer may require that the correlated data quickly provide an indication of the rate at which the security syndicates are being sold. Yet still another issuer may require that the correlated data quickly identify the geographic distribution for sales of the security syndicates.

At step 526, the issuer computer system 414 decides if a report should be generated. If no report is desired at the time, then control passes to block 2. If, however, the issuer computer system 414 would like to prepare a report, then control passes to step 528 where the report is generated. The reports can also vary depending on the particular issuer's requirements, and are primarily intended to present information that will assist the issuer computer system 414 in following and understanding the progress of transactions during the security syndicate offering. For example, one embodiment provides for reports that present a graphical analysis of the correlated data. Thus, the report can optionally correspond to the manner in which the data is correlated. At this point, control can return to step 518 where it is again determined if the expiration time has been reached.

According to one embodiment, after generating the reports at step 528, control passes to step 530. At step 530, the issuer computer system 414 and/or issuer's computer 416 identifies trends in the report generated. As previously indicated, the trends can be considered as indicators of the progress of the security syndicate offering. Depending on the particular trend identified, the issuer computer system 414 may optionally contact the senior manager computer system 418 at step 532. At step 534, the senior manager computer system 418 can adjust various values in the security syndicate offering to make the security syndicates either more attractive or less attractive to potential buyers. These adjustments in values are made based, at least in part, on information and/or permission received from the issuer computer system 414. After the values have been adjusted, control returns to step 518. It should be noted, however, that the senior manager might independently adjust these values without contacting the issuer, depending on the particular security syndicate offering and the relationship with the issuer.

Figure 6:
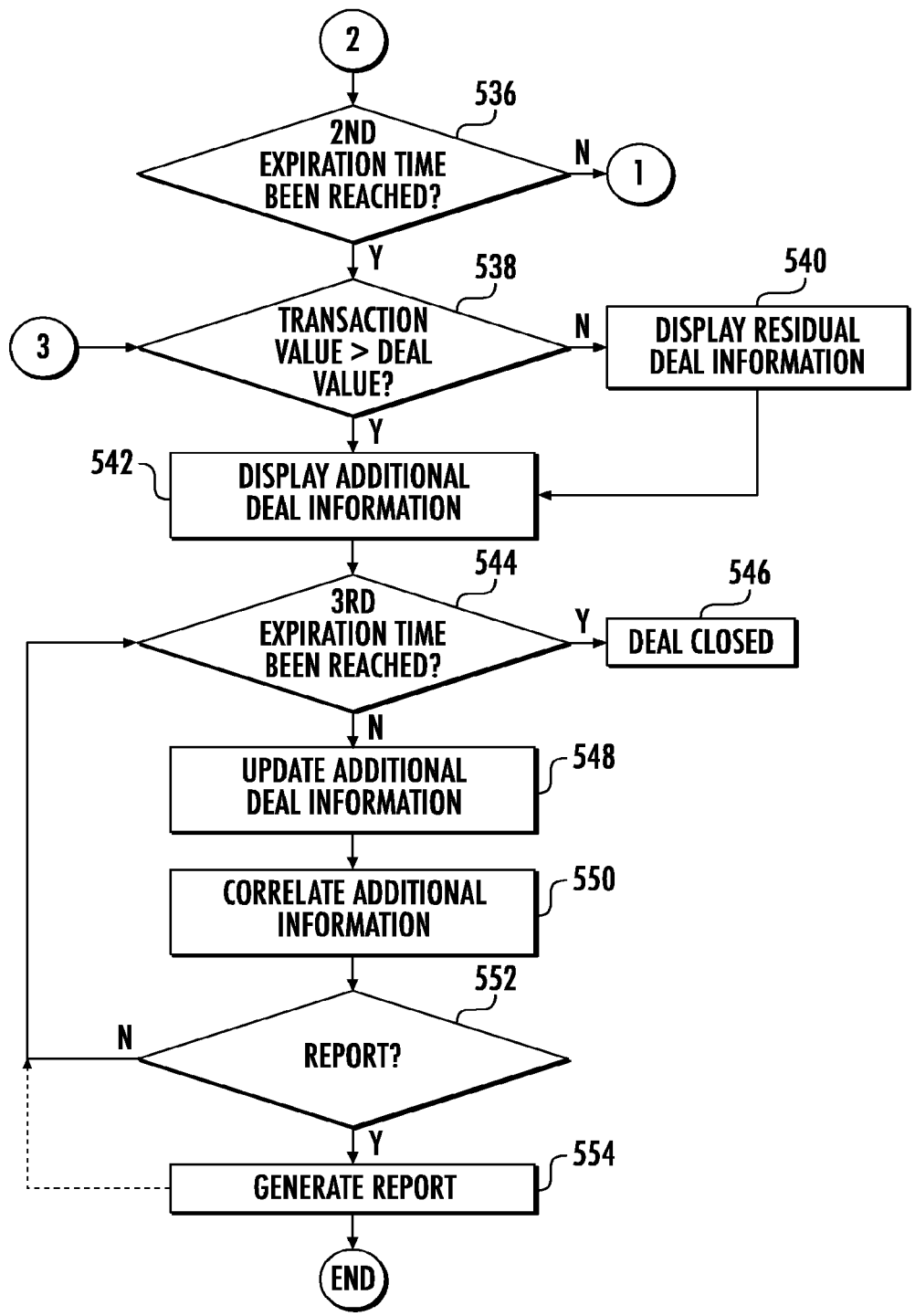
FIG. 6 illustrates steps performed when monitoring the flow of transactions during a security offering, according to an embodiment.

Referring to FIG. 6, if the issuer computer system 414 did not request a report at step 526, then control would now pass to step 536 (from block 2). At step 536, it is determined whether a second expiration time has been reached. The second expiration time corresponds generally to a time frame during which orders for the security syndicates will be accepted. This often referred to as the order period. If the second expiration time has not been reached, then control passes to block 1. Block 1 returns control to step 522 and the process continues as previously discussed.

If the second expiration time has been reached, then at step 538, it is determined whether the current transaction value is greater than the security syndicate offering value. The transaction value corresponds to the monetary value of the security syndicates that have successfully been sold. The security syndicate offering value corresponds to the total monetary value of the security syndicate offering. Referring additionally to FIG. 5, if it was determined at step 518 that the expiration time had been reached, then the deal would be closed and control would have passed to block 3. As shown in FIG. 6, block 3 directs control to step 538. If the transaction value is not greater than the security syndicate offering value, then control passes to step 540.

At step 540, information is transmitted to the issuer's computer 416 so that the issuer computer system 414 may view a display of residual deal information. The residual deal information will generally correspond to security syndicates, or the amount of the security syndicates, that have not been sold after the security syndicate offering is closed. Control then passes to step 542. In addition, if the transaction value was determined to be greater than the security syndicate offering value, then control would also have passed to step 542. At step 542, information is transmitted to the issuer's computer 416 so that additional deal information can be displayed to the issuer computer system 414. The additional deal information corresponds to allotment information for the sale of the security syndicates. The additional deal information can include, for example, the names of the financial institutions that are purchasing the security syndicates and the value of the purchases.

At step 544, it is determined if a third expiration time has been reached. The third expiration time generally corresponds to the end of an allotment period for allotting the security syndicates to various institutions and/or investors. If the third expiration time has been reached, then the security syndicate offering is closed (step 546). If the third expiration time has not been reached, then control passes to step 548. At step 548, data is transmitted to the issuer's computer 416 to update the additional deal information. At step 550, the issuer computer system 414 and/or issuer's computer 416 correlate the additional deal information. At step 552, the issuer computer system 414 determines if a report should be generated. If a report should be generated, then control passes to step 554. Otherwise, if a report will not be generated, then control passes to step 544 where it is again determined if the third expiration time has been reached. Once the report has been generated at step 554, the process can either end, or optionally return to step 544.

As previously discussed, data can be transmitted to the issuer's computer 416 for purposes of updating the deal information and the additional deal information, either automatically or manually. For example, automatic updating would occur by the security syndicate transaction computer system 410 transmitting the updated data to the issuer's computer 416 every time the senior manager computer system 418 transmits transaction data to the security syndicate transaction computer system 410. Alternatively, the issuer computer system 414 can select a refresh button on the computer display to manually request transmission of updated data from the security syndicate transaction computer system 410.

The system described herein (sometimes referred to as "book running system) can be used to control the flow of information between syndicate members 426 during security syndicate offering. The book running system provides the senior manager computer system 418 with at least some of the tools necessary to configure, manage, and process the security syndicate offering. Thus, the book running system would provide the senior manager computer system 418 with an ability to collect and enter data pertaining to the syndicate group and the security syndicate offering. Once the data has entered, the embodiments may be used by the issuer computer system 414 to monitor the flow of transactions. In some embodiments, a user such as an issuer may be connected via their mobile phone or a computer to the systems described in FIGS. 2-4, which displays for them the active issuance of bonds and other financial instruments at different maturity bonds.

Figure 7:
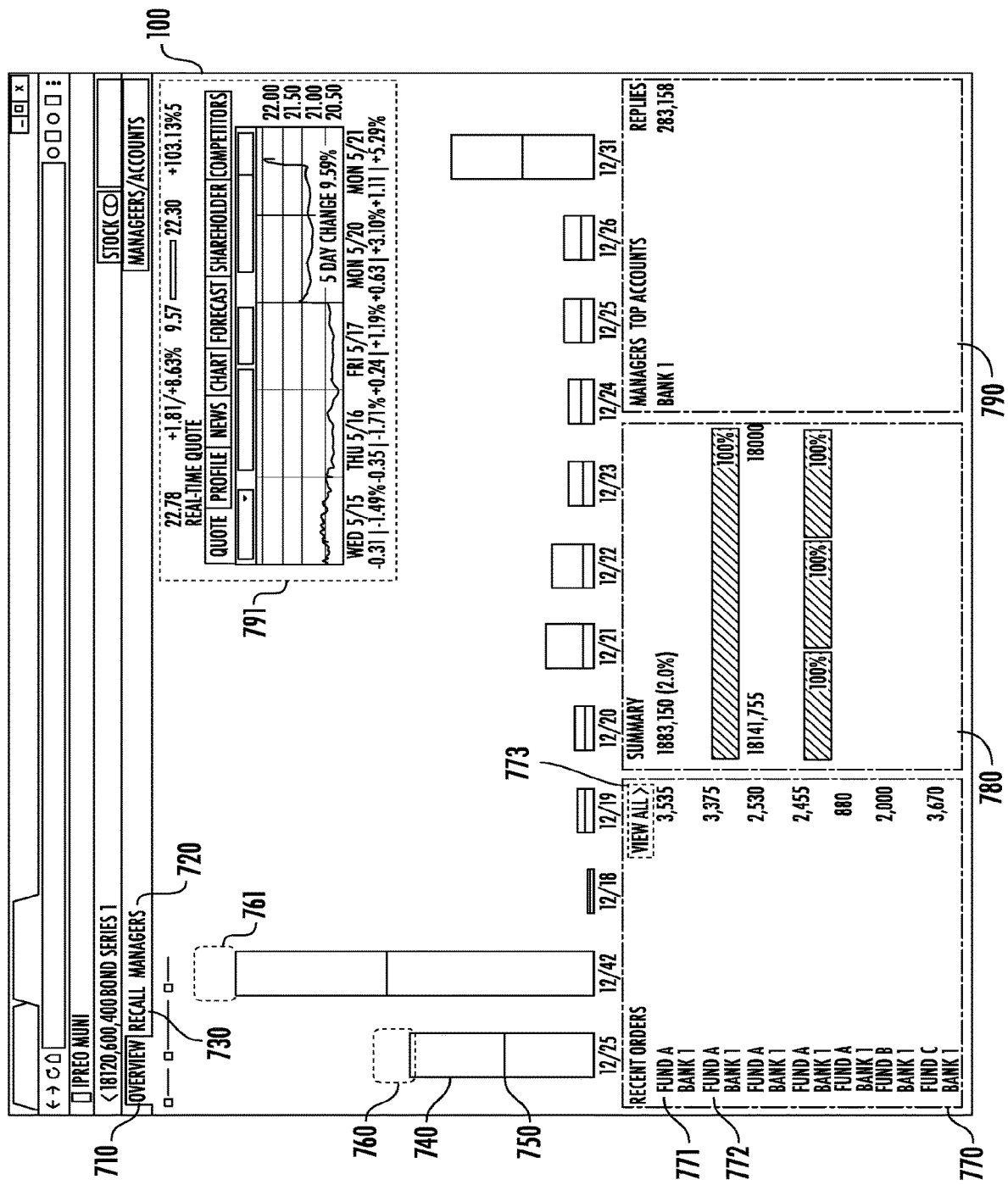
FIG. 7 illustrates a graphical user interface displaying offering data, according to an embodiment.
Figure 8:
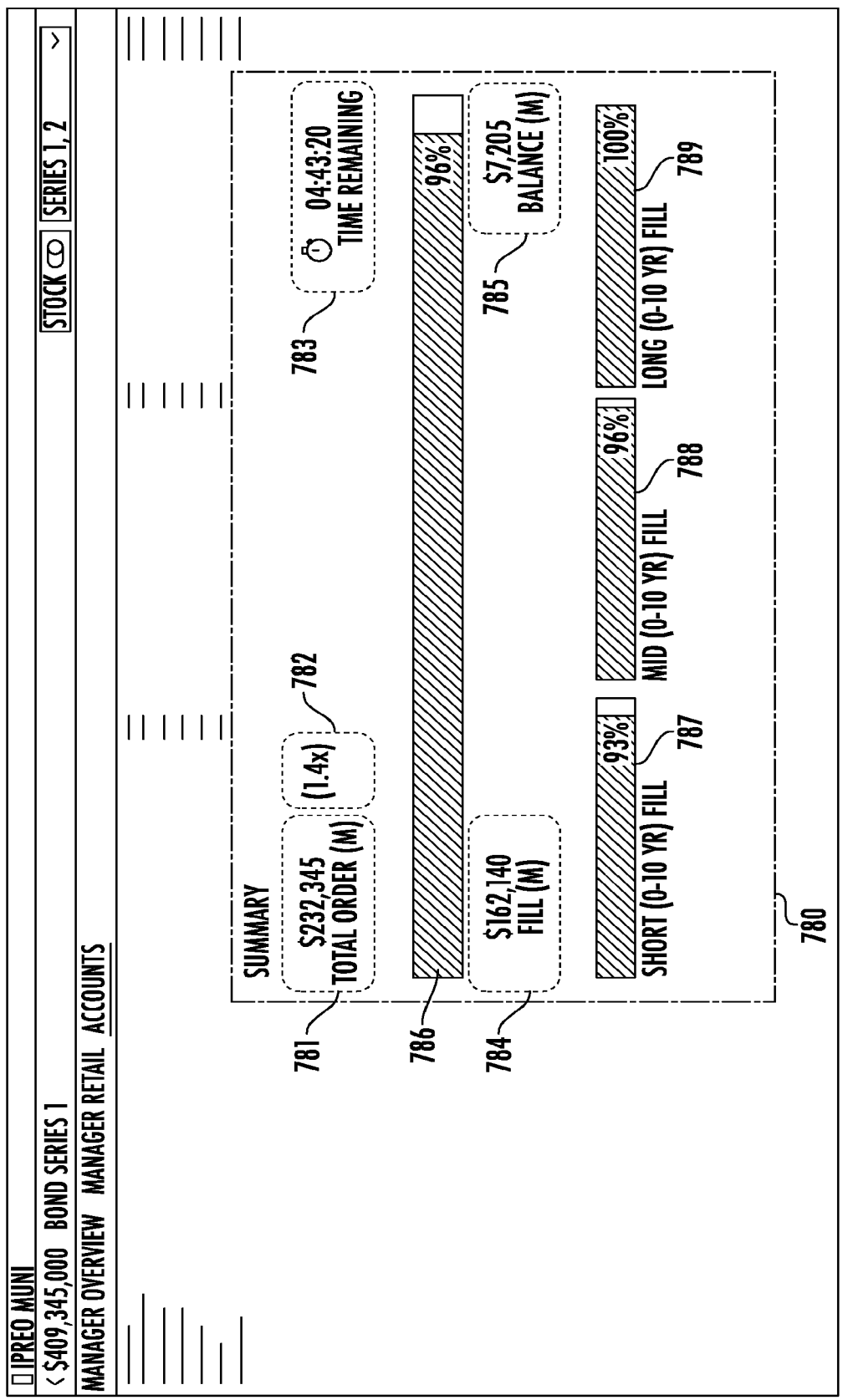
FIG. 8 illustrates a graphical user interface displaying offering data, according to an embodiment.

FIG. 7 illustrates a graphical user interface displaying offering data, according to an embodiment. The illustrated graphical user interface (GUI 700) may be presented on an issuer's electronic device such as a computer, tablet computer, smart phone, or the like. The GUI 700 may include a recent orders tab that illustrates the recently ordered maturity bonds (not shown), a summary tab that illustrates all the maturity bonds (not shown), a top managers and accounts tab that illustrates the top managers associated with a subset of maturity bonds (interactive hyperlink 720), and an overview section (710).

The overview section 710 (illustrated in GUI 700) may include the illustrated vertical bar charts with a line illustrated within the chart. Each vertical bar (for example, vertical bar 740) may represent a maturity such as a maturity for a specific year and month. The height of the bar may represent a dollar amount for that maturity. For example, the vertical bar 740 represents the total dollar amount for a particular maturity for December 2035. The line in the bar (e.g., line 750) represents the total number of dollars that are available in the par amount for the maturity. Therefore, the area filling the bar chart above the line indicates the amount that a maturity is oversubscribed. The number 760 (illustrated on the top of each vertical bar) may indicate how much each maturity is oversubscribed. GUI 700 is configured to illustrate any transaction data regarding any security syndicate and is not limited to maturity bonds.

"Oversubscribed" is a term used for situations in which a new security issue, such as a stock or bond, is underpriced or in great demand by investors. When a new security issue is oversubscribed, the parties offering the security (e.g., issuers) can adjust the price or offer more securities to reflect the higher-than-anticipated demand. For example, the number 760 indicates 2.0×, and number 761 indicates 1.7×; the number 760 indicates that the December 2035 maturity bond is oversubscribed by two times and the number 761 indicates that December 2042 maturity bond is overs subscribed by a factor of 1.7 times. Typically, an oversubscribed maturity bond offering indicates that the bond is in high demand, and therefore, a price increase by the issuer may be justified. A negative number (e.g., undersubscribed number of −1.0) indicates that the demand is less than the offered amount; therefore, a price decrease may be needed. The GUI 700 allows the parties involved in bond trading (particularly the issuers) to easily and quickly determine whether to increase or decrease the price for a particular bond with specific maturity dates.

The GUI 700 also provides different lens options (illustrated at the top of the GUI 700 as different toggles), which when clicked by the user, may display or modify the GUI 700 to display a specific category of maturity bonds. For example, the user may click on retail (interactive hyperlink 730) or managers (interactive hyperlink 720). When a user clicks on retail (interactive hyperlink 730), several columns may be grouped into one and their accumulated data reflected based on a specific retailer. Selecting manager (interactive hyperlink 720) may allow a user to see all data sorted based on their respective sales manager (e.g., what maturity bonds are being sold and how they are performing under that manager). Clicking on manager (interactive hyperlink 720) may also allow the user to further select a manager and view all maturity bonds related to that manager (e.g., all maturity bonds under the particular manager's management or bids approved by the manager). Utilizing this feature, users can quickly gage each manager's performance. Similarly, clicking on retail (interactive hyperlink 730) allows the user to narrow the bonds displayed by a particular retailer and gage that particular retailer's performance.

GUI component 770 may include recent orders that were placed or processed. GUI component 770 may be dynamically updated in real time (e.g., as the orders are received and/or processed). Therefore, the most recent order may be presented on the top or the bottom of the recent orders list. For example, order 771 indicates that Fund A has placed an order for 3,535 orders of a December 2022 bond. Order 772 illustrates an order for 3,375 orders for a December 2021 bond by the same Fund A. Clicking the option "View All" (interactive hyperlink 773) presents a pop up of all the orders. Similarly, "View All" may take the user to another screen with a complete list of all the orders, which may be customized, sorted, and filtered by a variety of factors, such as amount, ordering entity, time of order, and the like. The user may utilize the GUI component 770 to track individual orders as they are received (e.g., received by the security syndicate transaction computer system). The users are also able to sort the orders by geographic location (e.g., zip code associated with the orders). For example, the GUI 700 may display a map and indicate all the orders received in a user-friendly manner (e.g., heat map or color-coded). The webserver may be dynamically display and continuously update the GUI component 770 in order to illustrate the latest order data. Utilizing the data displayed in the GUI component 770, users may quickly be able to see order size, maturity, geographic data, investor name and the manager that has approved the order another example of displaying orders is described in FIG. 18.

Figure 16:
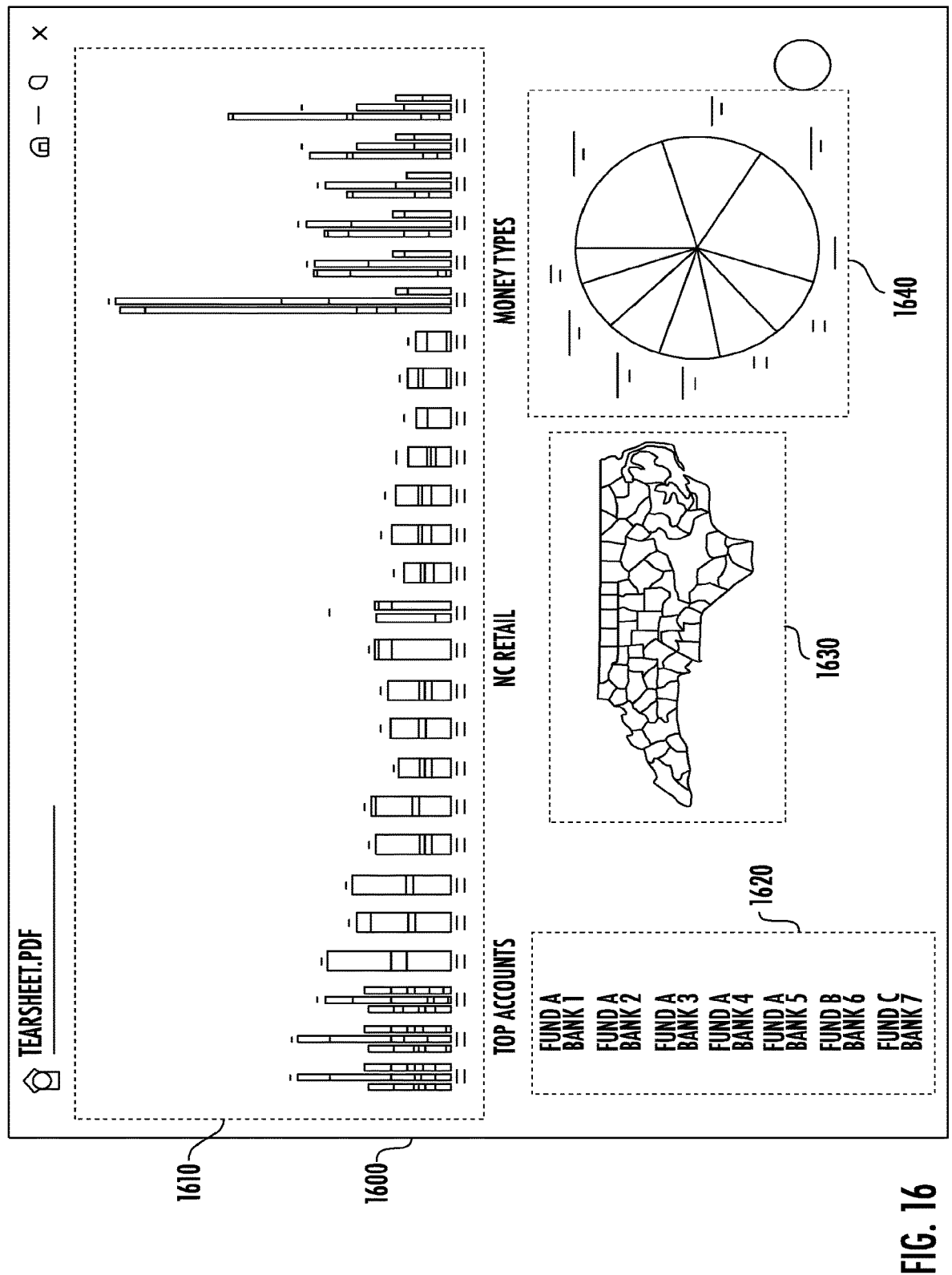
FIG. 16 illustrates a graphical user interface displaying offering data and geographic analysis of the order, according to an embodiment.

FIG. 16 illustrates a graphical user interface displaying syndicate offering data and geographic analysis of the orders, according to an embodiment. As described above, in addition to displaying the maturity bond data, the webserver 412 may also display geographical and order analysis. For example, GUI 1600 illustrates that, in some embodiments, the webserver 412 may display the maturity bond data (e.g., GUI component 1610) as described in FIG. 7, latest order data (GUI component 1620) as described in FIG. 7, geographical analysis (e.g., GUI component 1630), and granular order data (e.g., GUI component 1640). The GUI component 1630 may display a heat map of order locations (e.g., location from which the orders have been received). A heat map is a representation of data in the form of a map or diagram in which data values are represented as colors. For example, as illustrated by the GUI component 1630, when more orders are received from a geographic location, that geographic location is displayed using darker colors. The location analyzed may be limited to a specific state (e.g., as illustrated by the GUI component 1630) or illustrate a nationwide study of all orders received.

The GUI component 1640 is a pie chart that represents a granular analysis of all the orders received. A pie chart is a type of graph in which a circle is divided into sectors that each represents a proportion of the whole. For example, the pie chart illustrated in GUI component 1640 illustrates different sectors that represent different type of investors who have placed orders for maturity bonds illustrated in GUI component 1610. The colors used in the pie chart may match the color used to illustrate the orders in GUI component 1610. In some embodiments, a user may export the GUI 1600 (e.g., save and transmit all the data) to another electronic device. For example, an issuer may save a snapshot of the GUI 1600 (e.g., image or a file comprising metadata that represents all the information represented in GUI 1600). The snapshot file may be shared with other computing devices and transmitted over a network (e.g., Internet).

The summary tab (GUI component 780) may include a countdown clock, the total orders that have been received, percentage indicators for short, mid, and long-term bonds, and a total order fill indicator. Another illustration of the summary tab is presented in FIG. 8. In GUI component 780, an indicator of the total orders (in dollars or any other specified currency) is displayed. In the example illustrated in FIG. 8, for example, $232,345 of orders have been placed (GUI component 781) with an oversubscription factor of % 140 or 1.4× (GUI component 782) when four hours, forty-three minutes and twenty seconds remain before the end of issuance (GUI component 783). Further, the GUI component 784 presents orders that are filled (e.g., processed). In this example, the GUI component 780 displays $162,140 (784) with a remaining balance of $7,205 (GUI component 785) and a fill rate indicator 786 that states 96% (e.g., 96% of the order have been processed/filled). The short, mid and long maturity bonds may be categorized and indexed showing what percentage of the orders are in each category (e.g., fill rate indicators 787-789).

As described herein the terms short, mid, and long refer to a relative time for which the maturity bond matures. For example, if a maturity bond matures in five years, the maturity bond may be considered a short because a client may have selected all bonds maturing within the next ten years to be considered "short." These time thresholds may be predetermined or received from the client (e.g., issuer's computer described in FIG. 4A). Displaying the short, mid, and long fill indicators can be useful during the day of a transaction or the day of issuance as issuers may proactively and quickly see which groups are low or high where live pricing may be altered. For example, if short-term maturity bonds (e.g., 0-10 years) are 20% and long term are 80%, an issuer may lower prices of short term and/or raise prices of long term in order to balance orders. Fill rate indicators (e.g., fill rate indicators 787-789) may be updated in real time to accurately and quickly indicate above-mentioned fill rates and indicate the overall deal progress across the entire curve or by sections (e.g., they may be customized and filtered by the user to show only a desired cross sections of orders).

Referring back to FIG. 7, GUI 700 may also include a GUI component 790. GUI component 790 may display the top managers and accounts and may track aggregate investor and syndicate member participation on a particular deal. For example, GUI component 790 may display the largest participant on top or arranged vertically by size (or any other method customized by the user). Another illustration of the top managers and top accounts tab is presented in FIG. 9. In GUI component 790, users may generate reports to get a thorough breakdown of orders by either syndicate member or investors across priority types, syndicate member types or investor types. As shown in FIG. 9, the top accounts of Asset Manager A, Asset Manager B, XYZ Capital, etc., may be presented sequentially. For example, as illustrated, Asset Manager A is listed as having 53,000 orders and Asset Manager B as 37,500 orders. Similarly, number of maturity bonds may be displayed and used to organize the display order. In this way, issuers are able to see who is ordering the most and by how much.

Further, clicking on the names or rows of each asset manager displayed in GUI component 790 may bring a pop up GUI component or display of the account profile for that manager or account. The profile may include the holdings data for that manager/account. For example, the types of investments the manager has under management may be displayed. Similarly, contact information may be displayed including telephone number, work address, email address, geographic location, and URL. Finally, the type of money being managed may be displayed such as bond fund, hedge fund, etc. Clicking on the manager's name may include how their portfolios are broken down such as how many bond funds, how many mutual funds and how much managed account money is being received. The insurance type may be displayed with options such as whether new property or casualty are part of the assets in the account.

Figure 15:
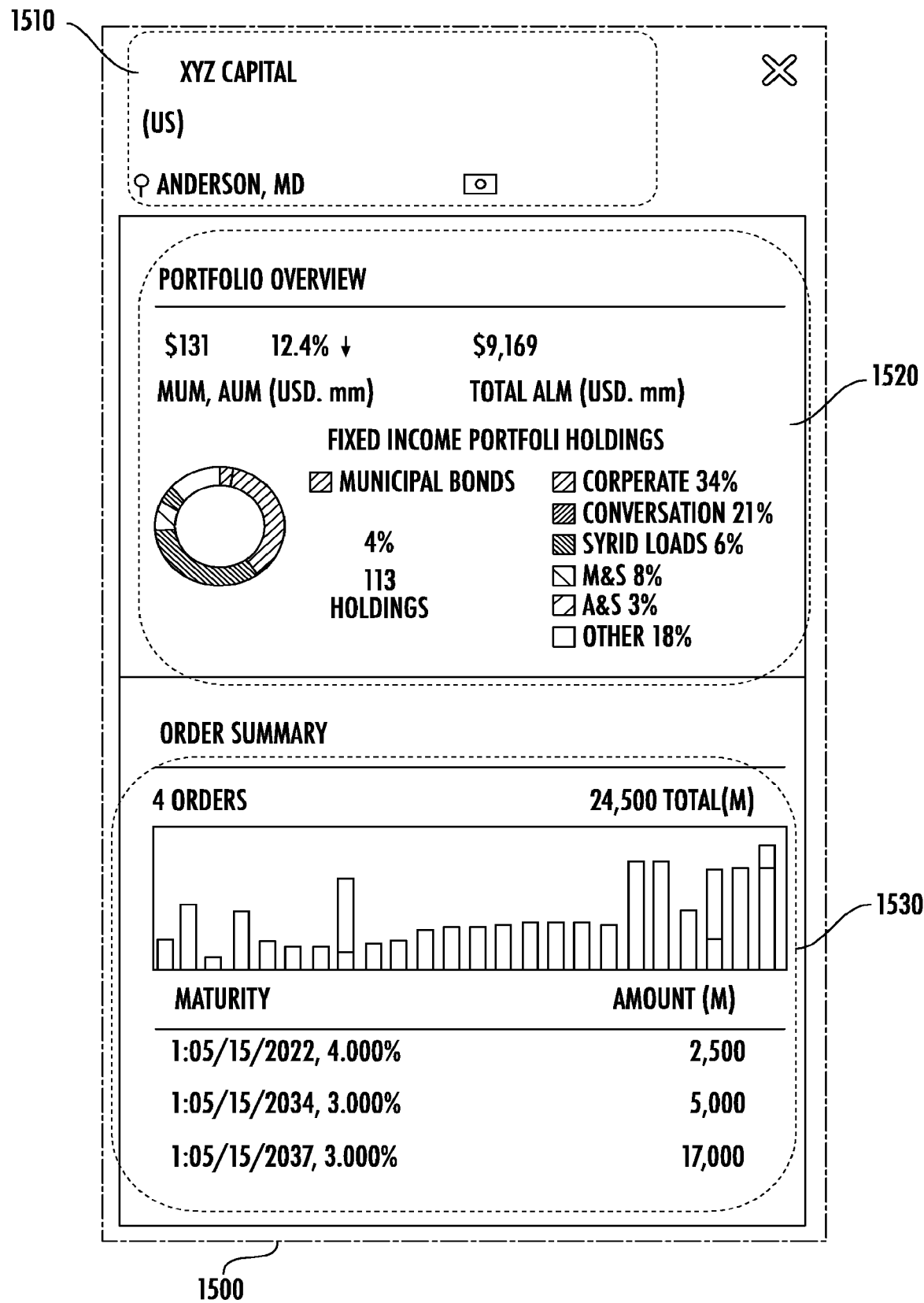
FIG. 15 illustrates a pop up graphical user interface component displaying manager profiles, according to an embodiment.

Referring now to FIG. 15, an example of a pop up GUI component displaying manager profiles is illustrated. By clicking on XYZ capital displayed on GUI component 790, pop up GUI component 1510 may be displayed. Pop up GUI component 1500 may comprise the name of the XYZ Capital, currency in which XYZ Capital trades, and a location associated with the XYZ Capital in GUI component 1510. GUI component 1520 may display total assets and an overview of the XYZ Capital's financial portfolio. Furthermore, GUI component 1530 may display an order summary of the XYZ Capital (e.g., amount and number of orders and other pertinent order information). GUI 700 may display the pop up GUI component 1500 in a separate page (displayed on a separate graphical user interface or a webpage) or display the pop up 1500 as a top layer displaying alongside the GUI 700.

Referring back to FIG. 7, GUI 700 may also include a GUI component 791 that is configured to display market data as customized by the user, such as a price ticker, S&P 500, Dow, Oil, Gold, or Muni ticker or index, current market news (e.g., financial news), and the like. For example, the user may customize the GUI component 791 to display a stock price ticker. A stock ticker is a report of the price for certain securities, updated continuously throughout the trading session by the various stock exchanges. A "tick" is any change in price, whether that movement is up or down. In some embodiments (as described in FIG. 14) by selecting GUI component 791, GUI 700 may display a pop up comprising additional and relevant economic data.

Figure 14:
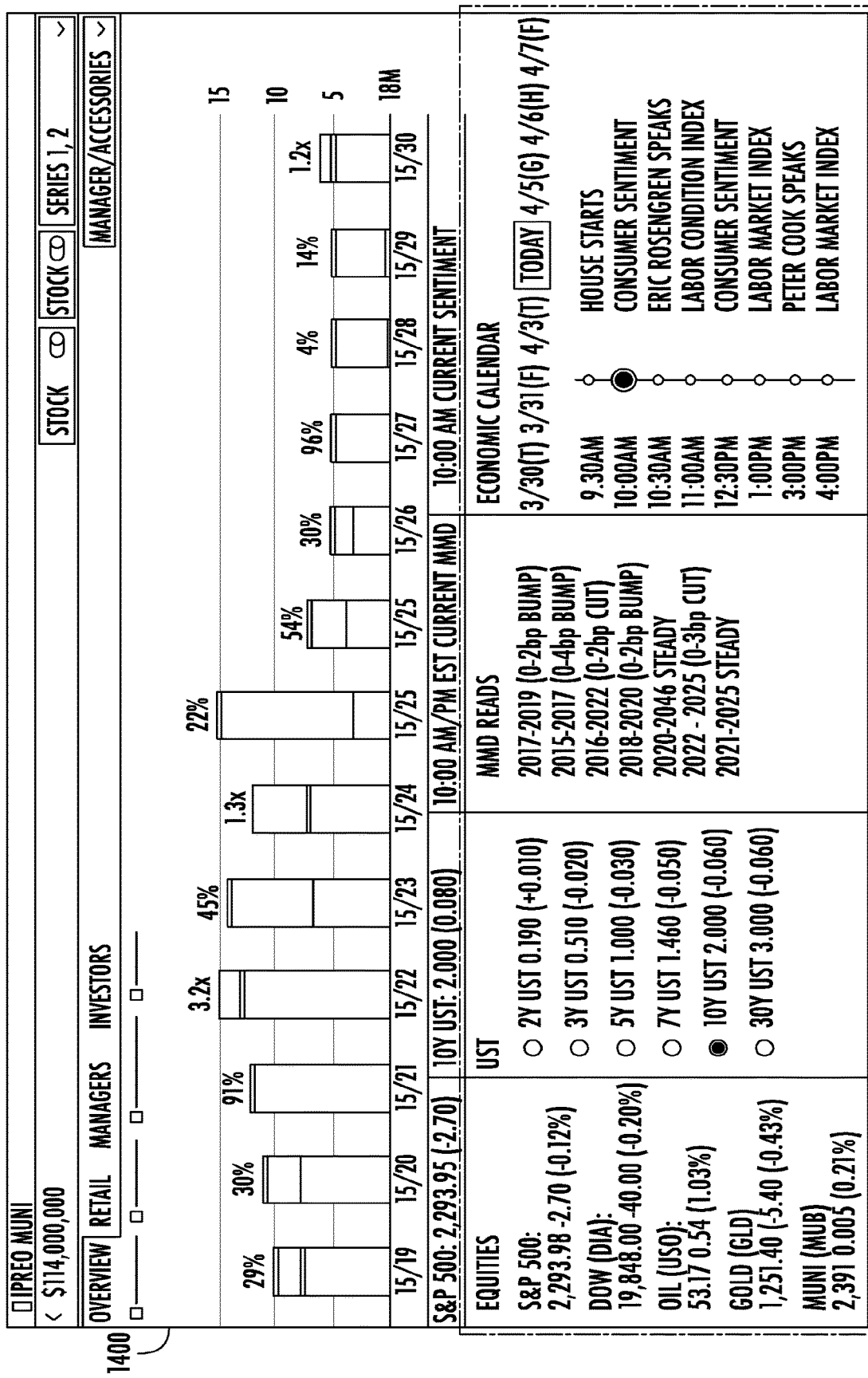
FIG. 14 illustrates a graphical user interface displaying offering data and additional economic data, according to an embodiment.

FIG. 14 illustrates a graphical user interface displaying syndicate offering data and additional economic data, according to an embodiment. In some embodiments, the webserver 412 may display economic data in addition to the maturity bond data. For example, upon a user engaging with a selectable GUI component (such as GUI component 791 described above), the webserver 412 may display a pop up window (such as pop up 1410) or a sliding GUI component comprising customizable economic data. Pop up 1410 may include S&P 500, Dow, Oil, Gold, or Muni ticker, United States Treasury Yield Rates (UST), Municipal Market Data (MMD) timelines, and an economic calendar (e.g., a calendar used by traders for tracking the occurrence of market-moving events). The user may customize the economic data viewed. For example, the user may customize the pop up 1410 to display S&P 500 price ticker instead of a gold price quotes. The user may also customize the color, font, and display location of the pop up 1410 or any economic data displayed.

Figure 10:
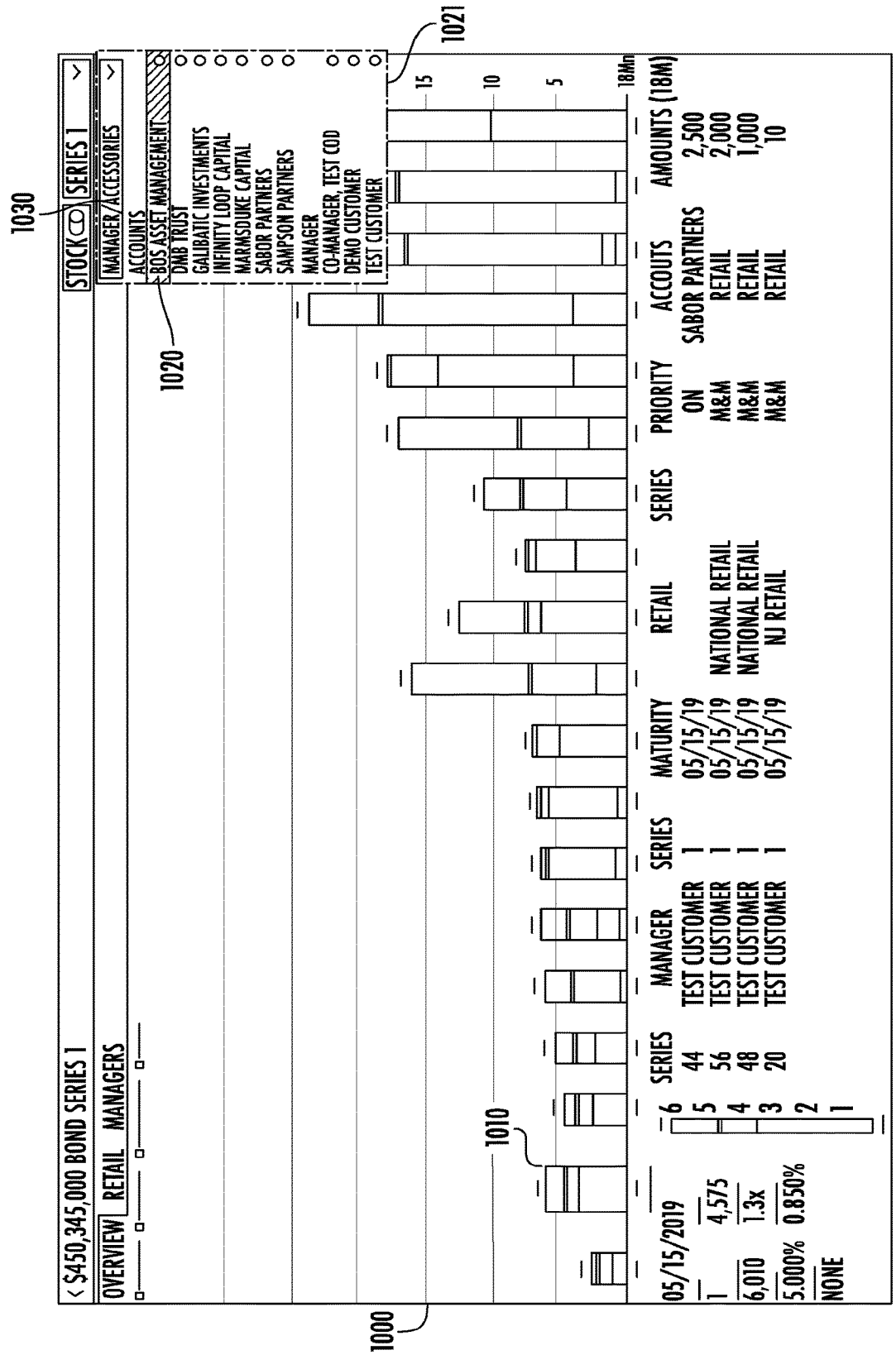
FIG. 10 illustrates a graphical user interface displaying offering data, according to an embodiment.

FIG. 10 illustrates another embodiment of the graphical user interface displayed for different parties described in FIGS. 4A-C. Some embodiments may include order control where a user may select various lenses to view an order book (e.g., portfolio of all the security syndicates) across tranches, including a general overview by priority type, retail categories and manager type. A user may click on any maturity bond displayed on GUI 1000 (e.g., selectable bar 1010) to retrieve further detail of the tranche and its orders. This feature is further described below. In some embodiments, a user may search for or select from a dropdown menu (e.g., menu 1020) any investor or syndicate member and view all their orders. For example, when the user clicks on the menu 1020, GUI 1000 may generate and display the pop up 1021 that comprises different accounts and different managers). Once the user clicks on any of the managers or accounts, the GUI 1000 may display a new interface that only displays order information filtered by the selected manager or account. Similarly, the user may directly search for a particular manager or account using the search engine 1030. A user may also view maturity bonds by series, coupon, or any other attributes that the user deems fit and combine into a single maturity at the click of a button.

Figure 11:
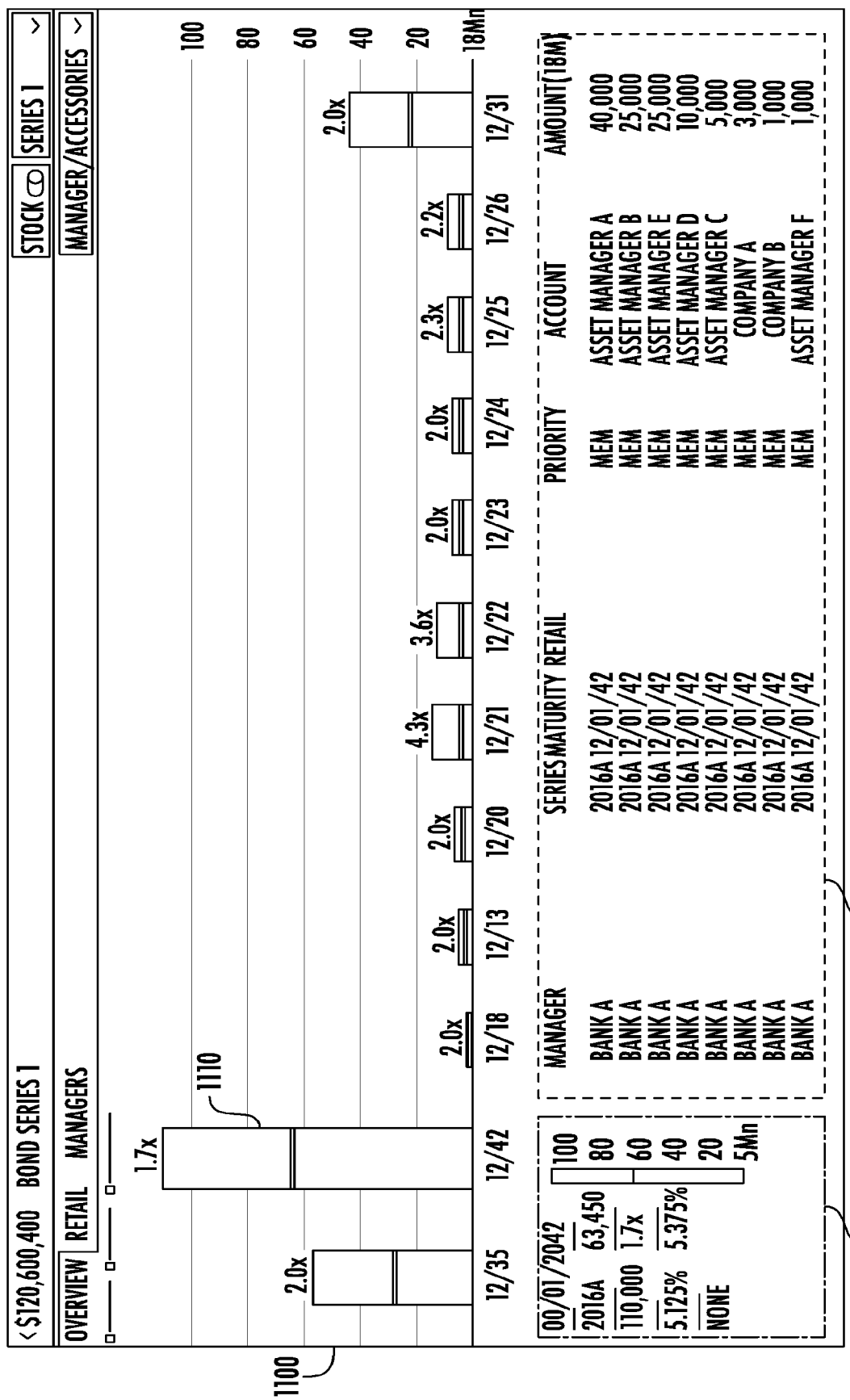
FIG. 11 illustrates a graphical user interface displaying offering data, according to an embodiment.

FIG. 11 illustrates another embodiment of the graphical user interface displayed for different parties described in FIGS. 4A-C. When a user clicks one of the bar charts or maturity bond displayed on the GUI 1100 (e.g., selectable bar chart 1110), GUI 1100 may display more granular data regarding that bond or order. In the example illustrated in FIG. 11, the user has clicked the bar chart 1110. In response, GUI 1100 populates and displays GUI component 1120 in the portion of the user interface below the selectable bar chart 1110 (or any other portion of the GUI 1100 as customized by the user). GUI component 1120 may be a pop up window or as a separate portion of the same window, which displays data relevant to selectable bar chart 1110. In the example illustrated in FIG. 11, the information displayed in GUI component 1120 is the series, the number of orders, the coupon rate, insurance information, the yield/price of the maturity, the amount of subscription, and the par value. A skilled artisan will appreciate that the information displayed in the pop up may be customized by the user or may be automatically generated based on the user's preferences or user's role. Further, the bar chart is zoomed in (e.g., is displayed using a larger font and a scale) with the dollar values that are easier to see for the par value and current subscription. GUI 1100 may also include order information for the maturity represented by selectable bar chart 1110. For example, GUI component 1130 lists order #2 for Manager Bank A and Account Asset Manager A to be at $40,000 (million). Similarly, order #13 at the bottom of the list is displayed as $1,000 (million) for Account Company B with Bank A again as the Manager. As described above, a user can easily peruse detailed information associated with different maturities. The user may also be able to glance (e.g., during a three to five second test) and see that the December 2019 maturity is two times over, the December 2021 maturity is 4.3 times over and the December 2031 maturity is two times over.

Figure 12:
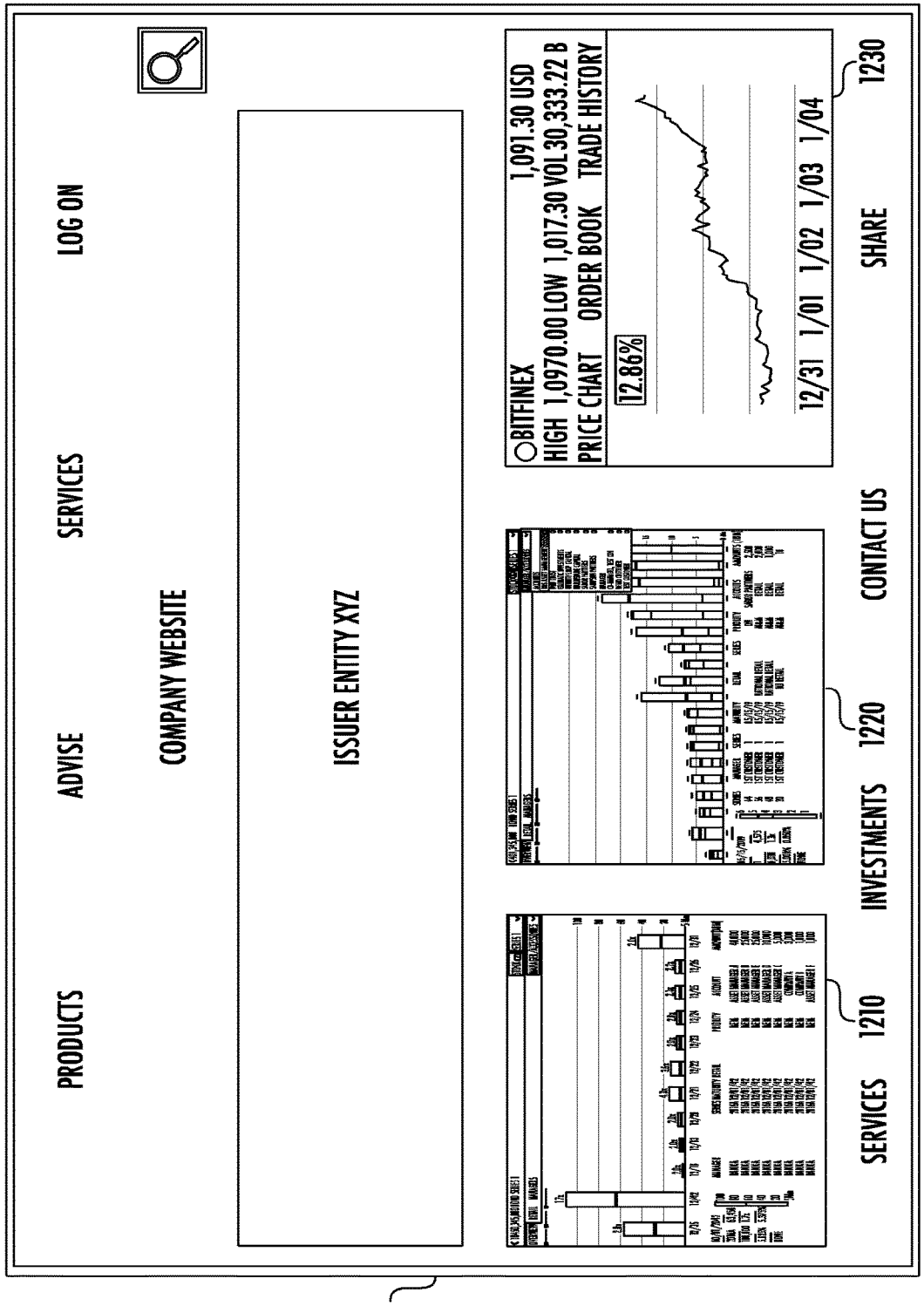
FIG. 12 illustrates multiple graphical user interfaces displaying offering data using a client's customized graphical user interface, according to an embodiment.

FIG. 12 illustrates multiple graphical user interfaces displaying offering data using a client's customized graphical user interface, according to an embodiment. In some embodiments, the webserver 412 may also have access to one or more databases or pre-stored web-based interfaces, such as webpages, comprising a number of preconfigured sub-interfaces or containers, dynamically populated from the transaction data analyzed. The webpages may be operated by a client (e.g., issuer computer system) and may contain proprietary code, such as HTML or PHP, presenting a variety of private content not known to the webserver 412 (e.g., GUI component 1230). These webpages may contain additional code for containers, where the container code may be modified to display customized content. In order to preserve the common "look-and-feel" of the client website and in order to create a better user experience, the webserver 412 may access the container code and display any of the graphical user interfaces described above within the client website/webpage.

For example, instead of displaying separate graphical user interfaces on computer devices of an issuer Entity XYZ, the webserver 412 may query container code for the webpage 1200 (operated by the issuer entity XYZ and viewable only to XYZ employees) and populate the sub-interfaces 1210 and 1220 of the webpage 1200 with the appropriate data. The webserver 412 may display any of the above-mentioned graphical user interfaces while the webpage display is configured to maintain the web site's common aesthetic (e.g., other features displayed by the issuer entity XYZ, such as GUI component 1230). One skilled in the art will appreciate that the issuing company XYZ may be able to customize the font, size, color, coordinates and other attributes of the sub-interfaces 1210 and 1220.

FIG. 13 illustrates a graphical user interface displaying offering data in a tabular form, according to an embodiment.

In some embodiments, the webserver 412 may provide raw data (maturity bond data presented in tabular form) upon the issuer's request. For example, a selectable GUI component may be presented to the user and, upon the user engaging the selectable GUI component, a graphical user interface (such as GUI 1300) may display raw data corresponding to the maturity bonds displayed in a tabular form. Row 1310 may display the maturity date, series indicator, coupon percentage amount, and maturity bond amount; break down of different retailers (e.g., NJ retailer, national retailer, and total retailer), overall balance and whether the maturity bond is oversubscribed.

The processing subsystems 422 may also store additional data, such as an economic calendar including market conditions, price tickers, geographic location of the bidders and buyers, and the like within the above-mentioned dataset. In this way, a party with access to a deal dataset (e.g., a deal snapshot) is able to review a thorough history of the deal from the beginning (e.g., when the issuer indicates the initial price) to the end (e.g., when the syndicate offering is terminated and maturities are sold).

Figure 17:
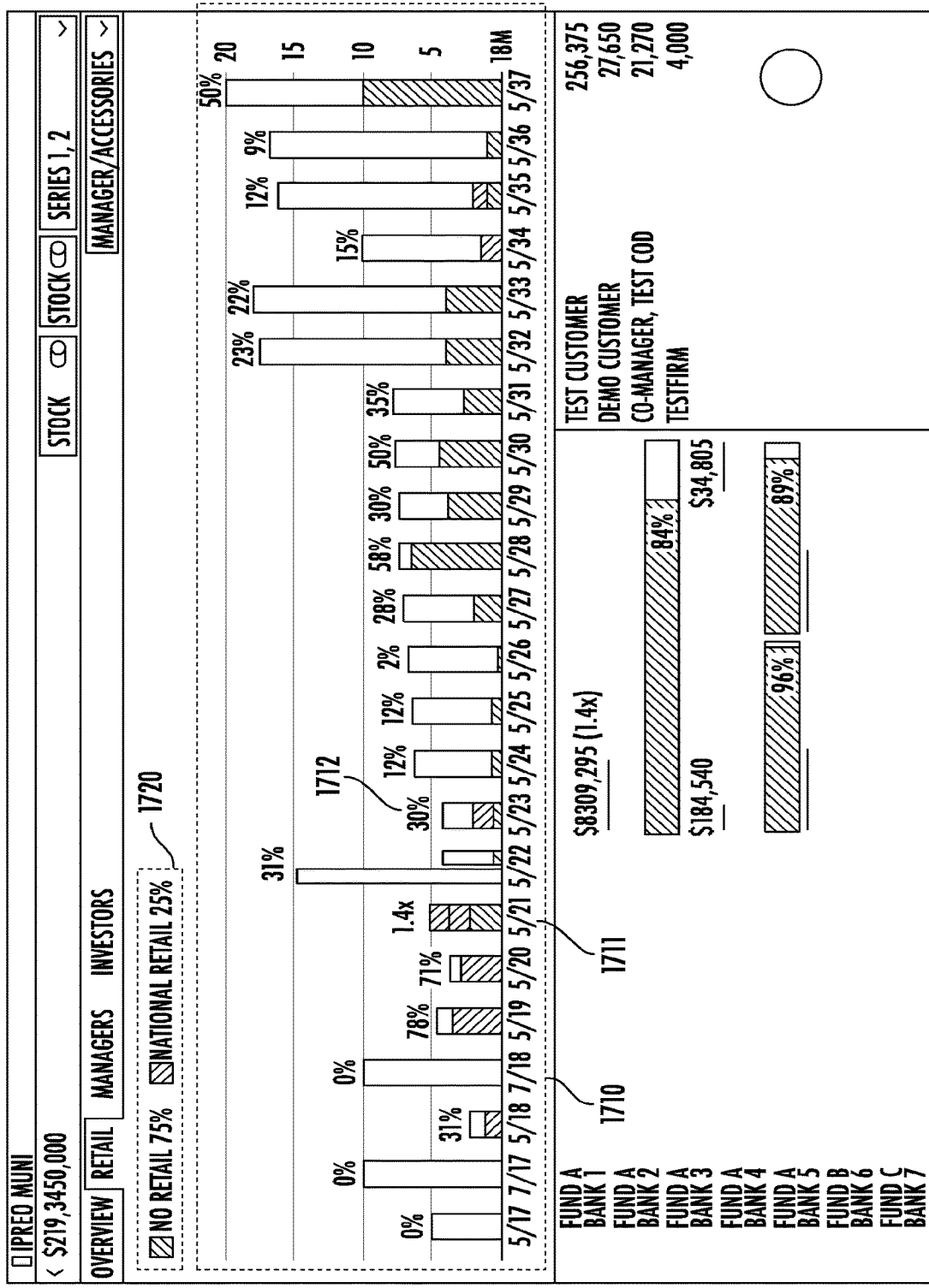
FIG. 17 illustrates a graphical user interface displaying customized offering data, according to an embodiment.

As illustrated by FIG. 17, users may customize the display of maturity bonds using various methods. For example, in GUI 1700, different maturity bonds are displayed. Each maturity bond (e.g., maturity bond 1711) displays the maturity date and is color-coded (based on the legend 1720) to illustrate the orders received from different geographic locations. By customizing the GUI 1700, the user may only view the orders received from New Jersey and compare the order received from New Jersey with the orders received nationwide. In some embodiments, if a particular maturity bond is oversubscribed (e.g., maturity bond 1711), different colors representing the orders may exceed the bounds of the maturity bond 1711. On the other hand, if the maturity bond is undersubscribed (e.g., maturity bond 1712), the color representing different orders may be shown in proportion to the undersubscription ratio. In other words, maturity bond 1712 is 50% undersubscribed; therefore, the graphical representation of the maturity bond 1712 represent a half-empty bar chart.

Figure 18:
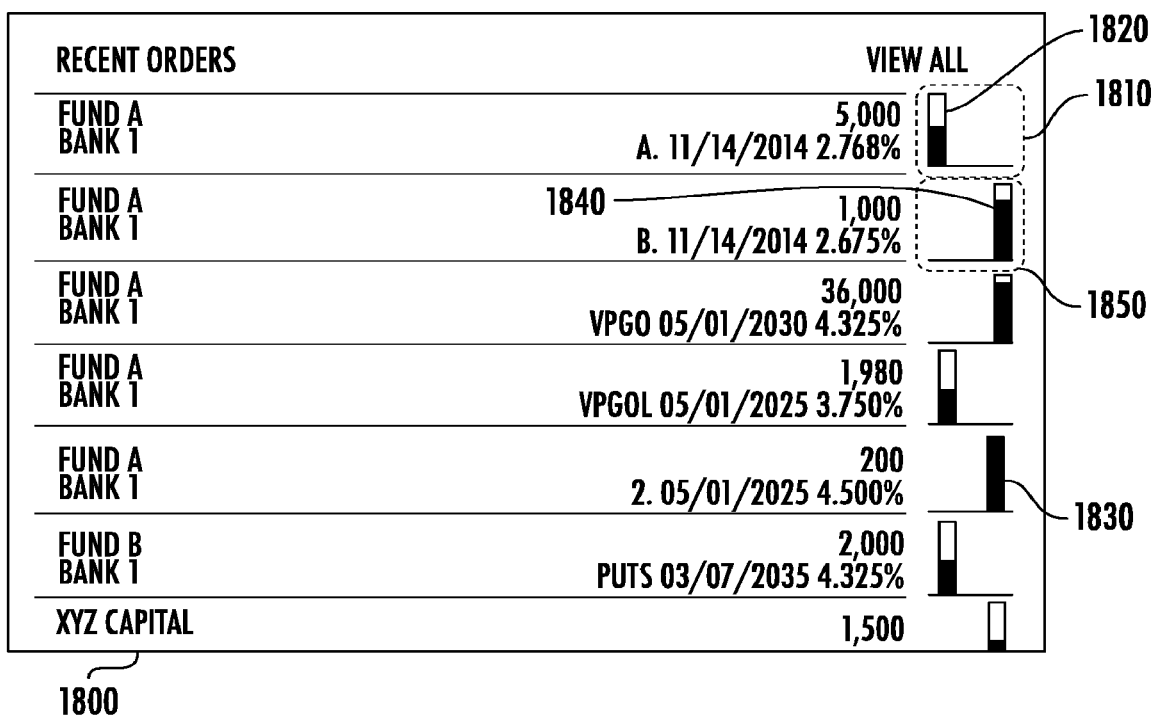
FIG. 18 illustrates a graphical user interface component that displays the orders received, according to an embodiment.

FIG. 18 illustrates a GUI component that efficiently displays the orders, according to an embodiment. As described above, different GUI components may display orders. For example, GUI component 770 (described in FIG. 7) may display recent orders that were placed or processed and may sort the orders based on time received, managers associated with the order, or the amount of the order. In another non-limiting embodiment, GUI component 1800 may dynamically display the orders based on the performance of the associated maturity bond. For example, GUI component 1800 may display that Bank 1 has placed an order for $5000 on maturity bond Fund A. Additionally, a performance indicator 1810 may be displayed that allows the user to quickly gage the performance of Fund A. Performance indicator 1810 may comprise a subscription rate indicator 1820 that graphically illustrates whether Fund A is oversubscribed or under subscribed. The subscription rate indicator may comprise a fill bar that is filled in accordance to a subscription percentage. For example, when a maturity bond is fully subscribed, the subscription rate indicator is shown as filled (e.g., subscription indicator 1830) and when a maturity bond is half subscribed, the subscription rate indicator is half-filled. Performance indicator 1810 may also illustrate an order process rate for each maturity bond. For example, when 0% of the orders for a maturity bond have been processed, the subscription rate indicator may appear on the left of the performance indicator (e.g., subscription rate indicator 1820 being displayed on the left side of the performance indicator 1810) and when 100% of the orders for a maturity bond have been processed, the subscription rate indicator may appear on the right side of the performance indicator (e.g., subscription rate indicator 1840 being displayed on the right side of the performance indicator 1850). One skilled in the art will appreciate that other methods may be used to illustrate the performance of each maturity bond, such as color-coding the performance indicator.

Figure 21:
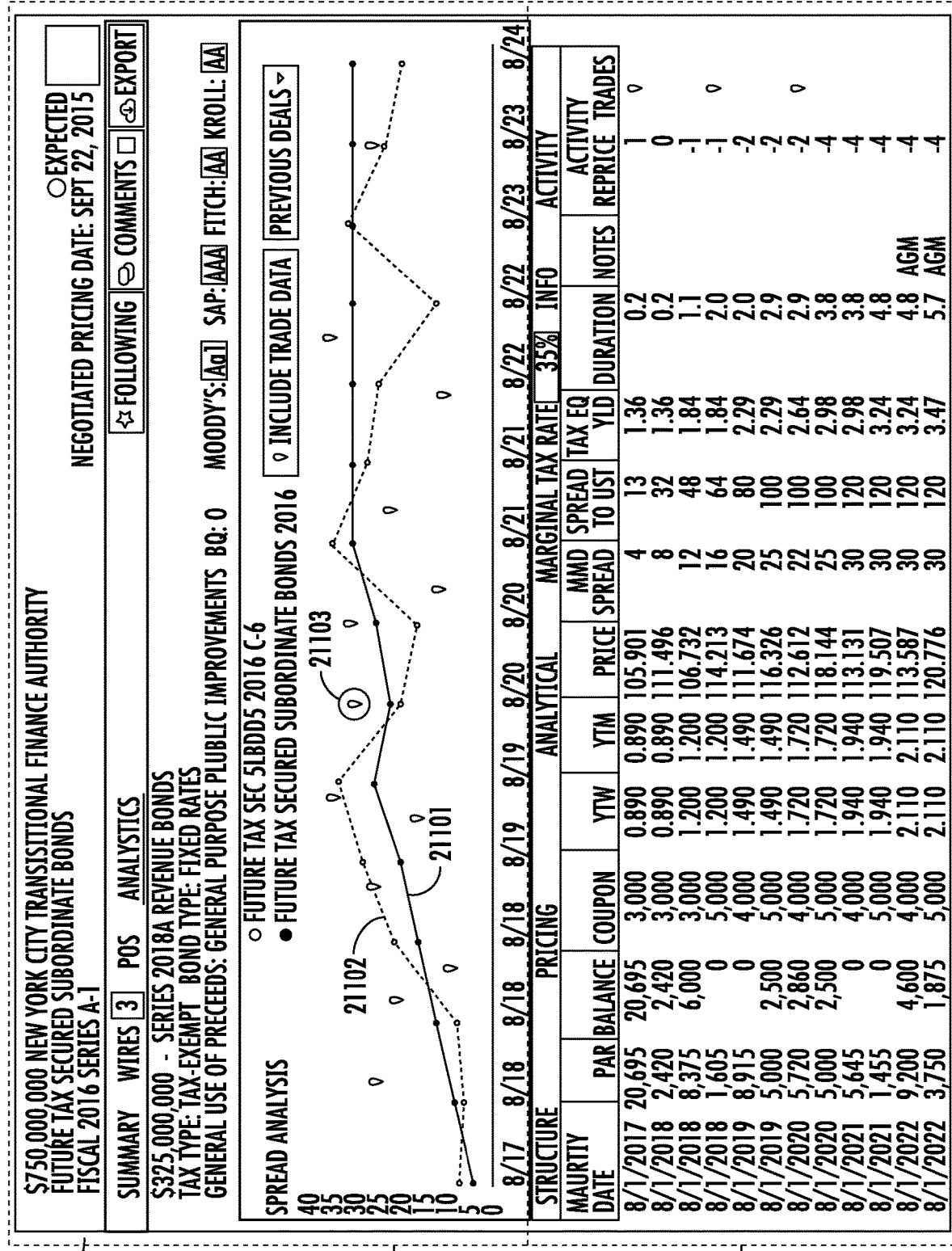
FIG. 21 illustrates a graphical user interface displaying customized offering data, according to an embodiment.

In some configurations, the method and systems described herein can be utilized to display data regarding various aspects of one or more offerings. For instance, the various servers described above may aggregate deal data from various issuers and display aggregated data on a computing device of the buy-side, sell-side, or both. Various parties described herein can utilize such aggregated data to optimize offerings (e.g., select suitable prices, understand supply and demand in the market, and gauge market movements). Non-limiting examples of these market analytics are illustrated in FIGS. 19-21.

Figure 1:
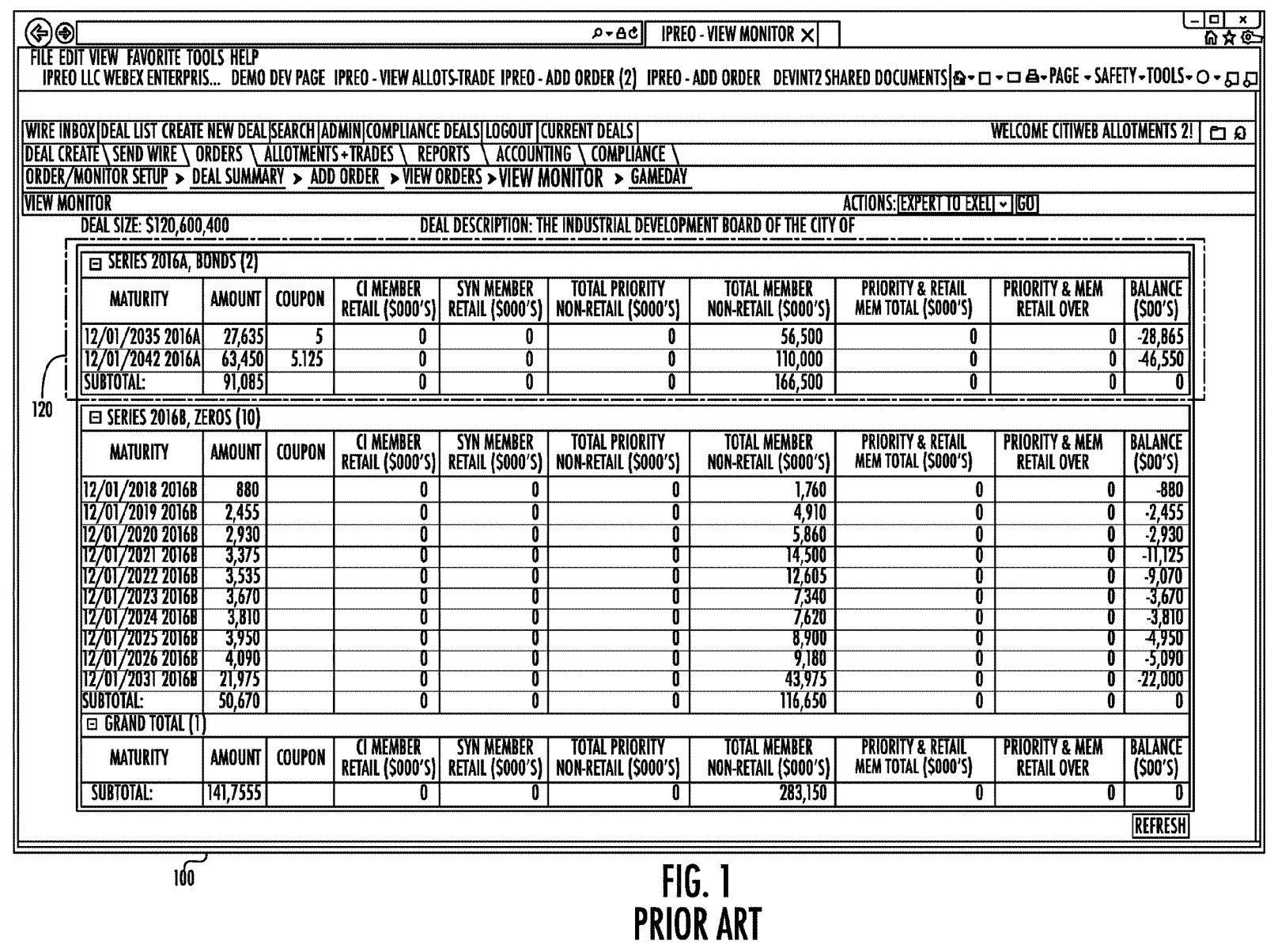

FIG. 19 illustrates a graphical user interface displaying offering data, according to an embodiment. As described above, the GUI 1900 can be displayed on a variety of computers within the computer system illustrated in FIGS. 1-4C.

GUI 1900 may include two main graphical components (e.g., graphical components 1910 and 1920). The graphical component 1920 may display various offerings and their attributes. When a user interacts with a particular offering, the GUI 1900 may dynamically update the graphical component 1910 to display detailed data regarding that particular offering. Users may filter/sort the offerings displayed within the graphical component 1920 using various attributes, such as time of offering, geographic location of the offering, issuer attributes, and the like.

The graphical component 1920 may display component 1921 that lists the date and par amounts for various offerings. The component 1922 displays a name of each offering. The component 1923 may display credit rating for each offering. Component 1924 may display tax information (e.g., tax status) of each offering (e.g., issuer of the offering). Component 1925 may then display the type of the offering (e.g., bond or stock) associated with each offering. Component 1926 may display a sector/category associated with each offering. For instance, each offering may be categorized within a sector (e.g., health care, utilities, or transportation).

The graphical component 1920 may also include component 1927 that displays certificates (if any) associated with each offering. Furthermore, component 1929 may display an indication of a lead manager associated with each offering.

Each component representing an attribute of an offering may be an interactive component where a user viewing the GUI 1900 may interact with to view more details. For instance, when a user clicks on (or otherwise interacts with) the offering represented by the component 1940, the GUI 1900 dynamically updates the graphical component 1910.

The graphical component 1910 may include the illustrated vertical bar charts. Each vertical bar may correspond to a time frame (e.g., year, month, or any other inputted time frame). Each vertical bar (for example, vertical bar 1911) may represent a maturity for a tranche (or any other segmentation of an offering) such as a maturity for a specific year and month. As described above, different bond offerings may include multiple tranches maturing at different rates. Therefore, an offering may include multiple bonds maturing within a predetermined period (a bond due in 2020 and another bond maturing in 2021). The graphical component 1910 may aggregate all the tranches (and their respective amortization rates) within a time frame and may display a vertical bar per time frame. For instance, the graphical component 1910 may display a vertical bar for each year or every five years. In some configurations, users may input/revise the time frame associated with the vertical bars.

The height of each vertical bar may represent a total amount for that maturity. For example, the vertical bar 1911 represents the total dollar amount for the bond/tranche maturing in 2028. Each vertical bar may also include a line, as depicted. The line within each vertical bar may separate each vertical bar into two separate areas where each area represents a different attribute. For instance, areas 1912 and 1913 illustrate whether a deal is competitive or negotiated. These areas may be visually distinguishable using different colors and/or different patterns. The size of each area (e.g., the height) may represent a dollar amount associated with whether the deal is negotiated or competitive.

As depicted, area 1912 represents the amount of the deal (represented by the vertical bar 1911) that was sold via a negotiated process. In contrast, area 1913 represents the total amount sold via a competitive process.

In some configurations, a competitive sale and a negotiated sale are the two methods by which an underwriter may purchase municipal bonds from an issuer for reoffering to the public. In a competitive sale, bonds are advertised for sale. The advertisement, by way of a notice of sale, includes both the terms of the sale and the terms of the bond issue. Any broker dealer or dealer bank may bid on the bonds at the designated date and time. The bonds are awarded to the bidder offering the lowest interest cost. In a negotiated sale, an underwriter is selected to purchase the bonds. The underwriter, in turn, sells the bonds to its investor customers. The terms of the bonds are tailored to meet the demands of the underwriter's investor clients, as well as the needs of the issuer. Negotiated sales may also involve a process known as a presale in which underwriters seek customer indications of interest in the issue before establishing final bond pricing.

GUI 1900 allows users to view maturity details while simultaneously gauging a proportion (and amount) of negotiated sale vs. competitive sale. Therefore, the GUI 1900 displays multiple market fundamentals and market analytics in a graphical user interface that is easy to understand. Market fundamentals may represent changes in credit and/or changes in risk appetite in the market. These factors may be the driving factor in price fluctuations. For instance, when market fundamentals are perceived to be "good," the equity markets may experience an increased rate of activity. As more inventors/users purchase more interests (e.g., more bonds), interest rates may also increase.

Market technical may also affect the markets. Therefore, users/inventors may use the detailed data displayed within the GUI 1900 for making informed investment decisions. Market technical may refer to certain fundamental economic indicators, such as supply and demand. These powerful conditions may also affect prices for any commodity, such as bond offerings. The vertical bars displayed in the GUI 1900 provide a breakdown of supply (of bonds/tranches) throughout the supply curve. Different type of buyers may be more interested in tranches maturing at different rates. For instance, insurance companies may desire to buy around the 20-year maturity, many big mutual funds may purchase bonds maturing in 30 years, or retail buyers may purchase bonds with maturity dates within 10 years. Therefore, users can use the GUI 1900 to easily view how various bonds are offered (e.g., supplied) and make informed decisions accordingly.

The GUI 1900 displays various indicators that allow users to understanding details (e.g., the "break up") of the supply of multiple offering. For instance, a user can easily identify spikes in supply and whether a particular year has more maturing bonds than others years do. Understanding details of the supply curve may be useful when submitting bids to purchase bonds in the market. Simply put, the detailed data displayed within the GUI 1900 may convey how supply/demand and other detailed data associated with the sale of various bonds may affect the market and the interest rates in short and long term.

The GUI 1900 may also aggregate the vertical bars displayed within the graphical component and further display an indicator illustrating a maturity progression for each offering. For instance, component 1928 (displayed within the graphical component 1920) may display indicator 1930 that illustrates an aggregated maturity rate of its corresponding offering. For instance, indicator 1930 illustrates that "New York City transactional finance authority" offering includes bonds that mature later than other offerings (e.g., indicator 1931). Using these indicators displayed within the component 1928, users may quickly compare maturities for different offerings. For instance, a user can easily/quickly determine that the "Evergreen school district" offering has tranches that mature substantially more rapidly than the "Cucomonga" offering.

Specifically, the vertical height and the horizontal placement of each bar within the indicator 1930 may correspond to an amount and maturity time for each tranche within its respective offering. In some configurations, the indicator 1930 may resemble the vertical bars displayed within the graphical component 1910.

As described above, user may click on any attribute of an offering where the GUI 1900 dynamically modifies the graphical component 1910 accordingly. For instance, a user may use the indicators displayed within the component 1928 to quickly compare offering maturities and gauge amortization rapidity. However, users may click on particular indicators and view more detailed maturity bar charts, as illustrated in the graphical component 1910. In some embodiments, a user may aggregate multiple offerings and the graphical component 1910 may display charts that represent data associated with more than one offering.

As described above, users may customize the GUI 1900. For instance, users may sort, rank, and filter the offerings based on any of the above-described attributes. For instance, a user may filter/rank the offerings based on credit rating, tax status, or sectors. In some configurations, users may filter or sort offerings based on the "structure" components (component 1928). For instance, a user may sort the offerings based on when the majority of each offering's tranches mature.

In some configurations, the graphical user interfaces described herein can also display amortization charts without displaying any data associated with the bidding received and/or how the market has reacted to any particular offerings. FIG. 20 illustrates a graphical user interface displaying offering data, according to an embodiment. As described above, the GUI 1900 can be displayed on a variety of computers within the computer system illustrated in FIGS. 1-4C.

In some configurations, the server generating and maintaining the GUIs described herein do not (e.g., are prevented) display sales data for one or more users. For instance, GUI 20000 displays a particular offering and its tranche amortization (e.g., maturity). The size and/or height of each vertical bar may correspond to a total amount of offering. As depicted, the bars may be organized monthly (or any other predetermined time frame). Furthermore, unlike GUI 1900, the vertical bars may only focus on the offering and may not include any data associated with how various tranches have been sold. For instance, vertical bar 20100 may only illustrate deal amortization time and the amount offered (in dollars or any other currency).

FIG. 21 illustrates a graphical user interface displaying offering data, according to an embodiment. As described above, the GUI 21000 can be displayed on a variety of computers within the computer system illustrated in FIGS. 1-4C.

The GUI 21000 displays various pricing analytics related to one or more offerings. As depicted, the GUI 21000 may include graphical component 21100 and 21200. The graphical component 21200 may display various offerings and their attributes. When a user interacts with a particular offering, the GUI 21000 may dynamically update the graphical component 21100 to display detailed data regarding that particular offering.

The graphical component 21100 may include multiple lines representing different analytical results regarding an offering. Specifically, line 21101 may represent credit spread for different offerings/bonds. Credit spread, as used herein, may refer to the difference in yield between two bonds of similar maturity but different credit quality. For example, if the 10-year Treasury note is trading at a yield of 6% and a 10-year corporate bond is trading at a yield of 8%, the corporate bond is said to offer a 200-basis-point spread over the Treasury. This comparative method may allow users to compare various bond offerings against a benchmark. In some configurations, a widening credit spreads may indicate growing concern about the ability of corporate (and other private) borrowers to service their debt. In contrast, a narrowing credit spreads may indicate improving private creditworthiness. The credit spread may be based on a calculated risk compared to the U.S. Dept. of Treasury, benchmark spreads, or any other third party spreads.

Line 21102 may correspond to a comparison between the offering/bond and the same deal offered in the past. Users may use the line 21102 for comparing deals to the last time (previous time) the same deal was active in the market. Furthermore, users may also use line 21101 in conjunction with line 21102 to evaluate the offering.

In a non-limiting example, graphical component 21100 displays lines 21101 and 21102 for the "New York City Transitional Finance Authority" offering. The user may use the lines 21101 and 21102 to determine whether this offering is a better credit now, and whether the user should accept less credit spread to buy it. Because as a buyer users typically desire more credit spread, they may also desire higher rates (e.g., higher return or higher yield). Users may view the graphical component 21100 and may determine that this offering is not as attractive as the previous time this offering was brought to the market. User may determine that this offering is a riskier investment than the previous time the same offering was introduced to the market. In the depicted non-limiting example, portions of the line 21101 is below the line 21102. Therefore, a user can readily identify that the issuer is attempting offer some tranches at a lower credit spread (e.g., more aggressively). In other areas (e.g., where line 21101 is above the line 21102), the issue may be attempting to sell at a wider credit spread (e.g., less aggressively and more conservatively). These comparisons allow users to visually compare various attributes of one or more offerings and make an informed decision.

The GUI 21000 may also include indicators illustrating a trading attribute (e.g., price) of the offering in the market. For instance, when a user interacts with the indicator 21103, the GUI 21000 may display a price associated with what that particular tranche is being traded in the market.

The graphical component 21200 may display a spreadsheet displaying numerical values represented by the lines within the graphical component 21100. For instance, the graphical component 21200 may display various offerings and their corresponding attributes, such as maturity date, par amount, balance, pricing, coupons, third-party spreads, spread to UST, tax yield, and other attributes depicted.

In some configurations, users may toggle between any of the GUIs described herein to view different analytical results associated with one or more offerings. For example, a user may first view the offerings and its maturity in GUI 19000. Then the user may toggle to GUI 21000 to understand credit risk and pricing analytics before submitting an offer associated with a bond offering. Furthermore, these GUIs may be displayed on the buy-side computers, sell-side computers, or both. The GUIs, however, may be customized depending on the viewing party to avoid potential conflicts and maintain anonymity. For instance, a buy-side computer may be unable to view information of a bidding party (e.g., competitor's name and/or amount of the bid).

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise Random Access Memory (RAM), Read Only Memory (ROM), Electrically Erasable Programmable Read-Only Memory (EEPROM), CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a server, a set of orders in relation to an offering of one or more maturity bonds;
   displaying, by the server on a graphical user interface, a set of graphical indicators corresponding to the set of orders, wherein, for at least one order for at least one maturity bond, the graphical user interface displays a bar where a height of the bar is proportional to an amount that the at least one maturity bond is undersubscribed relative to a subscription threshold;
   receiving, by the server, at least one additional order for the at least one maturity bond; and
   dynamically updating, by the server, a horizontal position of the bar to indicate an order process rate for the at least one maturity bond in response to the at least one additional order.

2. The method of claim 1, wherein a position of the bar corresponds to a value of processing of a corresponding order.

3. The method of claim 2, wherein the height of the bar corresponds to a vertical height of the bar.

4. The method of claim 1, wherein the graphical user interface further displays a name of an entity associated with the at least one order.

5. The method of claim 1, wherein the graphical user interface further displays an order dollar value associated with the at least one order.

6. The method of claim 1, wherein the graphical user interface is updated in real-time or near real-time.

7. The method of claim 1, wherein the graphical user interface further displays a number of dollars that are available in a par amount for the at least one maturity bond or the at least one order.

8. The method of claim 1, wherein the graphical user interface further displays at least one of a total monetary value corresponding the at least one order, a time remaining indicator, or a short fill percentage, mid fill percentage, or long fill percentage.

9. The method of claim 1, wherein the graphical user interface further displays a manager associated with the at least one order.

10. The method of claim 1, wherein the set of graphical indicators corresponding to the set of orders based on a time value corresponding to each order.

11. A system comprising:
    a computer readable medium comprising non-transitory instructions, that when executed, cause a processor to:
    receive a set of orders in relation to an offering of one or more maturity bonds;
    display, on a graphical user interface, a set of graphical indicators corresponding to the set of orders, wherein, for at least one order for at least one maturity bond, the graphical user interface displays a bar where a height of the bar is proportional to an amount that the at least one maturity bond is undersubscribed relative to a subscription threshold;
    receive at least one additional order for the at least one maturity bond; and
    dynamically update a horizontal position of the bar to indicate an order process rate for the at least one maturity bond in response to the at least one additional order.

12. The system of claim 11, wherein a position of the bar corresponds to a value of processing of a corresponding order.

13. The system of claim 12, wherein the height of the bar corresponds to a vertical height of the bar.

14. The system of claim 11, wherein the graphical user interface further displays a name of an entity associated with the at least one order.

15. The system of claim 11, wherein the graphical user interface further displays an order dollar value associated with the at least one order.

16. The system of claim 11, wherein the graphical user interface is updated in real-time or near real-time.

17. The system of claim 11, wherein the graphical user interface further displays a number of dollars that are available in a par amount for the at least one maturity bond or the at least one order.

18. The system of claim 11, wherein the graphical user interface further displays at least one of a total monetary value corresponding the at least one order, a time remaining indicator, or a short fill percentage, mid fill percentage, or long fill percentage.

19. The system of claim 11, wherein the graphical user interface further displays a manager associated with the at least one order.

20. The system of claim 11, wherein the set of graphical indicators corresponding to the set of orders based on a time value corresponding to each order.

* * * * *